(12) United States Patent
Sekiguchi et al.

(10) Patent No.: US 9,327,879 B2
(45) Date of Patent: May 3, 2016

(54) MULTILAYER BODY AND CONTAINER

(75) Inventors: Tomonobu Sekiguchi, Osaka (JP);
Masashi Yamamoto, Osaka (JP);
Kazunori Yamada, Osaka (JP); Shuhei Kanno, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 449 days.

(21) Appl. No.: 13/148,786

(22) PCT Filed: Feb. 12, 2010

(86) PCT No.: PCT/JP2010/052025
§ 371 (c)(1),
(2), (4) Date: Sep. 20, 2011

(87) PCT Pub. No.: WO2010/093002
PCT Pub. Date: Aug. 19, 2010

(65) Prior Publication Data
US 2012/0118886 A1  May 17, 2012

(30) Foreign Application Priority Data

| Feb. 13, 2009 | (JP) | 2009-030750 |
| Mar. 30, 2009 | (JP) | 2009-083670 |
| Jul. 16, 2009 | (JP) | 2009-167553 |
| Sep. 29, 2009 | (JP) | 2009-225652 |
| Sep. 29, 2009 | (JP) | 2009-225653 |

(51) Int. Cl.
*B32B 27/10* (2006.01)
*B65D 43/02* (2006.01)
(Continued)

(52) U.S. Cl.
CPC ............... *B65D 43/02* (2013.01); *B32B 27/06* (2013.01); *B32B 27/10* (2013.01); *B32B 27/20* (2013.01); *B32B 38/00* (2013.01); *B32B 38/164* (2013.01); *C08J 7/02* (2013.01); *B32B 2038/0052* (2013.01); *B32B 2038/168* (2013.01); *B32B 2255/10* (2013.01); *B32B 2255/20* (2013.01); *B32B 2255/26* (2013.01); *B32B 2255/28* (2013.01); *B32B 2307/73* (2013.01); *B32B 2307/74* (2013.01); *B32B 2310/0418* (2013.01); *B32B 2405/00* (2013.01);
(Continued)

(58) Field of Classification Search
CPC . Y10T 428/25; Y10T 428/1352; B32B 27/10; B65D 43/02
USPC ............. 428/34.1, 34.2, 35.7, 35.9, 36.9
See application file for complete search history.

(56) References Cited

U.S. PATENT DOCUMENTS 2,643,048 A * 6/1953 Wilson .................. 383/32
2,664,237 A * 12/1953 Sanford ................ 229/232
(Continued)

FOREIGN PATENT DOCUMENTS

| DE | 10233830 A1 | 2/2001 |
| DE | 10244490 A1 | 3/2004 |
| EP | 1249468 A2 | 10/2002 |
| GB | 2336366 A * | 10/1999 |
| JP | 2002-210876 | 7/2002 |
| JP | 2005-516813 | 6/2005 |
| WO | 03068486 A1 | 8/2003 |
| WO | 03076091 A1 | 9/2003 |

*Primary Examiner* — Marc A Patterson
(74) *Attorney, Agent, or Firm* — Fox Rothschild LLP

(57) ABSTRACT

The present invention provides a multilayer body, a packaging material and a container, each of which can maintain excellent water repellent properties and non-adhesive properties. Specifically, the present invention describes a non-adhesive multilayer body wherein hydrophobic oxide fine particles having an average primary particle diameter of 3-100 nm adhere to at least a part of the outermost layer.

11 Claims, 6 Drawing Sheets

(51) Int. Cl.
  *B32B 27/06* (2006.01)
  *B32B 27/20* (2006.01)
  *B32B 38/00* (2006.01)
  *C08J 7/02* (2006.01)
  *B32B 1/08* (2006.01)
  *B32B 38/16* (2006.01)

(52) U.S. Cl.
  CPC ........ *B32B 2435/02* (2013.01); *B32B 2439/00* (2013.01); *C08J 2323/06* (2013.01); *C08J 2323/12* (2013.01); *C08J 2325/06* (2013.01); *Y10T 428/13* (2015.01); *Y10T 428/249983* (2015.04); *Y10T 428/249986* (2015.04); *Y10T 428/25* (2015.01); *Y10T 428/254* (2015.01); *Y10T 428/259* (2015.01)

(56) References Cited

U.S. PATENT DOCUMENTS

| | | | | |
|---|---|---|---|---|
| 3,820,685 | A * | 6/1974 | Reisman | 206/508 |
| 5,175,051 | A * | 12/1992 | Schloegl et al. | 428/323 |
| 6,677,019 | B2 * | 1/2004 | Huffer | 428/36.91 |
| 7,767,760 | B2 * | 8/2010 | Chou | 525/207 |
| 2002/0150723 | A1 | 10/2002 | Oles et al. | |
| 2004/0047997 | A1 | 3/2004 | Keller et al. | |
| 2005/0084653 | A1 | 4/2005 | Nun et al. | |
| 2005/0118433 | A1 | 6/2005 | Oles et al. | |
| 2005/0208269 | A1 | 9/2005 | Nun et al. | |
| 2005/0227045 | A1 | 10/2005 | Oles et al. | |
| 2006/0112860 | A1 * | 6/2006 | Yoshitake et al. | 106/490 |
| 2006/0171872 | A1 * | 8/2006 | Adams | 423/335 |

* cited by examiner

Cross-sectional photograph of sample (packaging material) of Example 4 having hydrophobic oxide fine particles gravure coated (A) and dried on a sealant-type multilayer body

MULTILAYER BODY AND CONTAINER

INCORPORATION BY REFERENCE

The present application is a 371 of International Application No. PCT/JP2010/052025, filed Feb. 12, 2010, which claims priority to Japanese Patent Application Nos. 2009-030750 (filed Feb. 13, 2009), 2009-083670 (filed Mar. 30, 2009), 2009-167553 (filed Jul. 16, 2009), 2009-225652 (filed Sep. 29, 2009), and 2009-225653 (filed Sep. 29, 2009), the entire contents of which being hereby incorporated herein by reference.

TECHNICAL FIELD

The present invention relates to a multilayer body and container, and, in particular, to the technology described below.

The present invention relates to a multilayer body and a packaging material. It relates in particular to a multilayer body for use in tablecloths, napkins, aprons, table covers, floor mats, wall coverings, wallpaper, labels, release paper, tags, chair covers, water resistant sheets, umbrellas, ski wear, construction materials, bed covers, shoe surface materials, shoe covers, waterproof clothing, water repellant films, water repellant sheets and the like, and to a packaging material for use in packaging foods, drinks, medicines, cosmetics, chemical products and the like.

The present invention also relates to a non-adhesive container, and to a manufacturing method therefor. In particular, it relates to a container having superior non-adherence of the contents, and to a manufacturing method therefor. More specifically, it relates to a non-adhesive container for holding foods, drinks, medicines, cosmetics, chemical products and the like, and to a manufacturing method therefor.

The present invention also relates to a packaging material, and to a manufacturing method therefor. More specifically, it relates to a packaging material for use in packaging foods, drinks, medicines, cosmetics, chemical products and the like, and to a manufacturing method therefor. In particular, it relates to a packaging material having superior non-adherence of the contents.

The present invention also relates to a packaging material. More specifically, it relates to a packaging material for use in packaging foods, drinks, medicines, cosmetics, chemical products and the like. In particular, it relates to a packaging material having superior oxygen absorption properties and non-adherence of the contents.

BACKGROUND ART

A wide variety of packaging materials and containers are already known, and their contents are also varied. These include for example jelly candy, pudding, yogurt, liquid detergent, toothpaste, instant curry, syrup, petroleum jelly, facial cleansing cream, facial cleansing mousse and other foods, drinks, medicines, cosmetics, chemical products and the like. The contents also come in various forms, including solids, semi-solids, liquids, viscous materials, gels and the like.

In addition to sealing performance, the packaging materials used in packaging these contents are also required to have thermal adhesive properties, light shielding properties, heat resistance, durability and other properties suited to the contents, the package type, the application and the like. However, the following problem remains even if a packaging material satisfies all of these requirements. This is that the contents adhere to the packaging material. When the contents adhere to the packaging material it is difficult to use all of the contents, resulting in waste. Effort is required if the contents adhering to the packaging material are to be collected separately so that all the contents can be used. Therefore, in addition to sealing performance and the like as discussed above, packaging materials also need to have the property of resisting adherence of the contents to the packaging material (non-adhesive properties).

A content sticking preventive lid has been proposed (Patent Document 1) wherein in a lid provided with a heat seal layer and a base material layer integrated via an adhesive layer, the heat seal layer has a thickness exceeding 10 μm and is formed of a polyolefin containing a glycerin acid ester, polyglycerin fatty acid ester, pentaerythritol fatty acid ester, polyoxypropylene-polyoxyethylene block polymer, sorbitan fatty acid ester, polyoxyethylene alkyl ether, fatty acid amide or the like having a non-adhesive effect, and an intermediate layer formed of a polyolefin is interposed between the adhesive layer and the heat seal layer.

An apparatus provided with an easily cleanable surface coating has also been disclosed (Patent Document 2) wherein in an apparatus provided with an easily cleanable surface coating having heat resistance of at least 300° C., remarkable non-adhesive properties and a thickness of 1 to 1000 nm, the surface coating contains a metal oxide network and a hydrophobic substance, the hydrophobic substance is distributed uniformly relative to the thickness of the surface coating, and the surface coating is hydrophobic with a contact angle in excess of 90° with respect to water.

Patent Document 1: Japanese Patent Application Publication No. 2002-37310
Patent Document 2: Japanese Patent Application Publication No. 2004-130785

However, the materials of Patent Documents 1 and 2 do not provide sufficient adherence prevention effects. Further improvements are still needed for practical application.

DISCLOSURE OF THE INVENTION

Thus, it is a principal objective of the present invention to provided a multilayer body, packaging material and container capable of continuously providing non-adhesive properties superior to those of prior art.

As a result of exhaustive research in light of these problems of prior art, the inventors in this case perfected the present invention after discovering that this object could be achieved by adopting a multilayer body and packaging material having a specific structure.

That is, the present invention relates to the following multilayer body, packaging material and container.

1. A non-adhesive multilayer body having hydrophobic oxide fine particles having an average primary particle diameter of 3 to 100 nm attaching to at least part of the outside surface.

2. A multilayer body having hydrophobic oxide fine particles having an average primary particle diameter of 3 to 100 nm attaching to at least part of the surface of a layer containing a thermoplastic resin.

3. The multilayer body according to 2 above, wherein filler particles containing at least one of an organic component and an inorganic component are contained in the layer containing the thermoplastic resin.

4. The multilayer body according to 2 above, wherein the attaching amount hydrophobic oxide fine particles is 0.01 to 10 g/m².

5. The multilayer body according to 2 above, wherein the hydrophobic oxide fine particles form a porous layer having a three-dimensional network structure.

6. The multilayer body according to 2 above, wherein the specific surface area of the hydrophobic oxide fine particles according to the BET method is 50 to 300 m$^2$/g.

7. The multilayer body according to 2 above, wherein the hydrophobic oxide fine particles are of hydrophobic silica.

8. The multilayer body according to 7 above, wherein the hydrophobic silica has surface trimethylsilyl groups.

9. The multilayer body according to 3 above, wherein the average particle diameter of the filler particles is 0.5 to 100 μm.

10. A packaging material comprising a multilayer body according to any of 1 to 9 above.

11. A container for holding contents, which is a non-adhesive container wherein hydrophobic oxide fine particles having an average primary particle diameter of 3 to 100 nm attach to part or all of at least a container surface that comes into contact with the contents.

12. The non-adhesive container according to 11 above, wherein the attaching amount of hydrophobic oxide fine particles is 0.01 to 10 g/m$^2$.

13. The non-adhesive container according to 11 above, wherein the hydrophobic oxide fine particles form a porous layer with a three-dimensional network structure.

14. The non-adhesive container according to 11 above, wherein the specific surface area of the hydrophobic oxide fine particles according to the BET method is 50 to 300 m$^2$/g.

15. The non-adhesive container according to 11 above, wherein the hydrophobic oxide fine particles are of hydrophobic silica.

16. The non-adhesive container according to 15 above, wherein the hydrophobic silica has surface trimethylsilyl groups.

17. A product comprising a non-adhesive container according to 11 above, in which contents are packed in the container and sealed with a lid.

18. A method of manufacturing a container for holding contents, comprising a step of causing hydrophobic oxide fine particles having an average primary particle diameter of 3 to 100 nm to attach to part or all of at least a container surface that comes into contact with the contents.

19. A method of manufacturing a container for holding contents, comprising a step of causing hydrophobic oxide fine particles having a average primary particle diameter of 3 to 100 nm to attach to part or all of at least a container surface that comes into contact with the contents, and then applying heat treatment.

20. A packaging material formed of a multilayer body having at least a base layer and a thermal adhesive layer, with the thermal adhesive layer being laminated as the outermost layer of one surface of the packaging material, and hydrophobic oxide fine particles with an average primary particle diameter of 3 to 100 nm being attached to the outermost surface where the thermal adhesive layer does not adjoin another layer.

21. The packaging material according to 20 above, wherein the attaching amount of the hydrophobic oxide fine particles is 0.01 to 10 g/m$^2$.

22. The packaging material according to 20 above, wherein the hydrophobic oxide fine particles form a porous layer with a three-dimensional network structure.

23. The packaging material according to 20 above, wherein the specific surface area of the hydrophobic oxide fine particles according to the BET method is 50 to 300 m$^2$/g.

24. The packaging material according to 20 above, wherein the hydrophobic oxide fine particles are of hydrophobic silica.

25. The packaging material according to 24 above, wherein the hydrophobic silica has surface trimethylsilyl groups.

26. The packaging material according to 20 above, for use in a product comprising contents packaged in the packaging material such that the contents can contact the outermost surface of the packaging material on a thermal adhesive layer side.

27. A method of manufacturing a packaging material formed of a multilayer body having at least a base layer and a thermal adhesive layer, the method comprising a step of causing hydrophobic oxide fine particles with an average primary particle diameter of 3 to 100 nm to attach to the surface of the thermal adhesive layer.

28. The manufacturing method according to 27 above, further comprising a step of heating the multilayer body during and/or after the aforementioned step.

29. A packaging material which is formed of a multilayer body having at least a base layer and a thermal adhesive layer, and which is a lid, with the thermal adhesive layer being laminated as the outermost layer on one surface of the packaging material, hydrophobic fine particles with a primary particle diameter of 3 to 100 nm being attached to the outermost surface where the thermal adhesive layer does not adjoin another layer, and the hydrophobic oxide fine particles being configured to form a porous layer having a three-dimensional network structure.

30. A packaging material which is formed of a multilayer body having at least a base layer and a thermal adhesive layer, and which is for use as a bag, molded container, packaging sheet or tube, with the thermal adhesive layer being laminated as the outermost layer on one surface of the packaging material, hydrophobic fine particles with a primary particle diameter of 3 to 100 nm being attached to the outermost surface where the thermal adhesive layer does not adjoin another layer, and the hydrophobic oxide fine particles being configured to form a porous layer having a three-dimensional network structure.

31. A packaging material which is formed of a multilayer body having at least a base layer and a thermal adhesive layer, with the thermal adhesive layer being laminated as the outermost layer on one surface of the packaging material, an oxygen absorbent being included in at least one of the base layer and the thermal adhesive layer, and hydrophobic oxide fine particles with a average primary particle diameter of 3 to 100 nm being attached to the outermost surface where the thermal adhesive layer does not adjoin another layer.

32. The packaging material according to 31 above, wherein the attaching amount of the hydrophobic oxide fine particles is 0.01 to 10 g/m$^2$.

33. The packaging material according to 31 above, wherein the hydrophobic oxide fine particles form a porous layer having a three-dimensional network structure.

34. The packaging material according to 31 above, wherein the specific surface area of the hydrophobic oxide fine particles according to the BET method is 50 to 300 m$^2$/g.

35. The packaging material according to 31 above, wherein the hydrophobic oxide fine particles are of hydrophobic silica.

36. The packaging material according to 35 above, wherein the hydrophobic silica has surface trimethylsilyl groups.

37. The packaging material according to 31 above, wherein the oxygen absorbent contains metal particles coated on at least part of the particle surfaces with at least one of a resin component and an inorganic oxide.

38. The packaging material according to 31 above, for use in a product comprising contents packaged in the packaging material in such a way that the contents can contact the outermost surface on the side with the thermal adhesive layer.

ADVANTAGES OF THE FIRST INVENTION

The multilayer body and packaging material of the first invention can exhibit good water repellency and non-adhesive properties (or soil resistance). In particular, detachment of the hydrophobic oxide fine particles can be effectively reduced or prevented and good water repellency and non-adhesive properties can be effectively maintained when particulate filler comprising at least one of an organic component and an inorganic component is included in a layer containing a thermoplastic resin (herein sometimes called a "thermoplastic resin layer").

Moreover, it is possible to obtain excellent and lasting non-adhesive properties while maintaining good thermal adhesive properties when a thermoplastic resin layer is used as the thermal adhesive layer in the multilayer body or packaging material of the first invention. That is, good non-adhesive properties can be obtained without inhibiting the thermal adhesive properties in a practical sense, and without being affected by limitations on the type, thickness or the like of the thermal adhesive layer. More specifically, the hydrophobic oxide fine particles in the region of thermal adhesion do not inhibit the thermal adhesive properties because they become embedded in the thermal adhesive layer during the thermal adhesion process, while the hydrophobic oxide fine particles outside the region of thermal adhesion can provide strong non-adhesive properties because the particles are retained as is on the thermal adhesive layer.

Such a multilayer body can be used favorably in tablecloths, napkins, aprons, table covers, floor mats, wall coverings, wallpaper, labels, release paper, tags, chair covers, water resistant sheets, umbrellas, ski wear, construction materials, bed covers, shoe surface materials, shoe covers, waterproof clothing, water repellant films, water repellant sheets and the like. This multilayer body can also be used favorably as a packaging material for packaging foods, drinks, medicines, cosmetics, chemical products and the like, either as is or after further processing.

ADVANTAGES OF SECOND INVENTION

The non-adhesive container of the second invention can exhibit excellent non-adhesive properties without containing fluorine or other substances of concern. This allows almost all of the contents to be extracted from the container, thereby controlling or preventing loss of that part that adheres to the interior wall of the container.

Moreover, the method of manufacturing the second invention is advantageous from the standpoint of production efficiency, cost and the like because the hydrophobic oxide fine particles can be simply applied to at least that part of the surface of the container that comes into contact with the contents, without the need for complex processing. It is also applicable to containers of any material, such as glass containers, ceramic containers, paper containers, plastic containers, metal containers, wood containers and the like, without any restriction as to the material of container. It can also confer non-adhesive properties on a ready-made container after the fact. The non-adhesive properties can be further prolonged by heat treatment after the hydrophobic oxide fine particles are applied.

ADVANTAGES OF THIRD INVENTION

The packaging material of the third invention can demonstrate excellent non-adhesive properties while maintaining good thermal adhesive properties. That is, good non-adhesive properties can be obtained without inhibiting the thermal adhesive properties in a practical sense, and without being affected by limitations on the type, thickness or the like of the thermal adhesive layer. More specifically, the hydrophobic oxide fine particles in the region of thermal adhesion do not inhibit the thermal adhesive properties because they can sink into the thermal adhesive layer during the thermal adhesion process, while the hydrophobic oxide fine particles outside the region of thermal adhesion can show strong non-adhesive properties because they are retained as is on the thermal adhesive layer.

Moreover, the method of manufacturing the third invention is advantageous from the standpoint of production efficiency, cost and the like because the hydrophobic oxide fine particles can simply be applied to the thermal adhesive layer, and it is not necessary to control compounding of additives into the raw materials of the thermal adhesive layer, eliminating the need to control the compounding ratio and the like. As discussed above, moreover, it is also advantageous because thermal adhesion can be accomplished with the hydrophobic oxide fine particles attaching to the entire surface of the thermal adhesive layer, without the need for a margin to adhere.

Such a packaging material can be used effectively for a variety of applications including not only lids but also pillow bags, gusset bags, standing pouches, three-way sealed pouches, four-way sealed pouches and other pouches, molded containers, packaging sheets, tubes and the like.

ADVANTAGES OF FOURTH INVENTION

The packaging material of the fourth invention can provide excellent non-adhesive properties and oxygen absorption while maintaining good thermal adhesive properties. That is, good non-adhesive properties can be obtained without inhibiting the thermal adhesive properties in a practical sense, and without being affected by limitations on the type, thickness or the like of the thermal adhesive layer. More specifically, the hydrophobic oxide fine particles on the region of thermal adhesion do not inhibit the thermal adhesive properties because they can sink into the thermal adhesive layer during the thermal adhesion process, while the hydrophobic oxide fine particles outside the region of thermal adhesion can provide excellent non-adhesive properties because they are retained as is on the thermal adhesive layer.

Because an oxygen absorbent is included in at least one of the base layer and thermal adhesive layer, moreover, the desired oxygen absorbency can be obtained while avoiding particle detachment due to contact of the oxygen absorbent particles with the contents and the like. In particular, greater oxygen absorbency can be obtained together with good non-adhesive properties if the layer of hydrophobic oxide fine particles on the thermal adhesive layer is a porous material (that is, when a porous layer is formed). In this case, residual oxygen in the package body or oxygen generated by the contents can more efficiently pass through the porous layer and reach the oxygen absorbent contained in the thermal adhesive layer or the like. As a result, the oxygen is more effectively absorbed and removed by the oxygen absorbent, while the porous layer itself provides even greater non-adhesive properties.

Such a packaging material can be used advantageously for a variety of applications including pillow bags, gusset bags, standing pouches, three-way sealed pouches, four-way sealed pouches and other pouches, molded containers, packaging sheets, tubes and the like.

BRIEF DESCRIPTION OF THE DRAWINGS

In FIG. 3, "Lotus surface" indicates the "surface of a porous layer having a three-dimensional network structure of hydrophobic oxide fine particles".

BEST MODE FOR CARRYING OUT THE INVENTION

The basic configuration of the first through fourth inventions is a non-adhesive multilayer body having hydrophobic oxide fine particles having a primary particle diameter of 3 to 100 nm attaching to at least part of the outermost surface. Preferably, the hydrophobic oxide fine particles form a porous layer having a three-dimensional network structure. Water repellency or non-adhesive properties can be effectively obtained in this way. The first through fourth inventions are also explained individually.

First Invention

1. Multilayer Body, Packaging Material

The multilayer body of the first invention features hydrophobic oxide fine particles having an average primary particle diameter of 3 to 100 nm attaching to at least part of the surface of a layer containing a thermoplastic resin (hereunder sometimes called a "thermoplastic resin layer").

Figure 1:
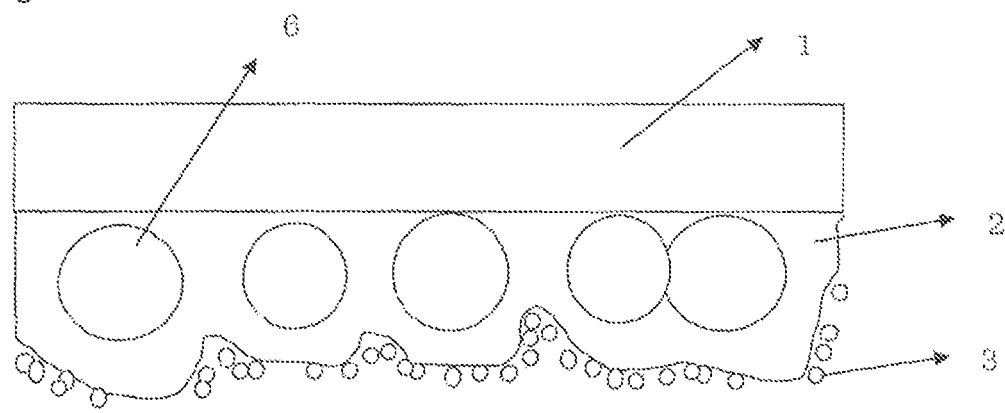
FIG. 1 is a view of the cross-sectional structure of one example of the multilayer body of the first invention.

FIG. 1 shows the cross-sectional structure of one example of the multilayer body of the first invention. In the multilayer body of FIG. 1, hydrophobic oxide fine particles 3 with an average primary particle diameter of 3 to 100 nm attach to the surface of thermoplastic resin layer 2 containing particulate filler 6 on base layer 1. Thermoplastic resin layer 2 is laminated on the outermost layer on one side of the packaging material (multilayer body). In thermoplastic resin layer 2, which is the outermost layer, hydrophobic oxide fine particles 3 with an average primary particle diameter of 3 to 100 nm attach to the surface (outermost surface) on the side not adjoining another layer (the base layer in FIG. 1). Hydrophobic oxide fine particles 3 are fixed by adherence to thermoplastic resin layer 2. That is, the hydrophobic oxide fine particles attach so that they are not detached from the layer even when they come into contact with the contents. In FIG. 1, the hydrophobic oxide fine particles 3 may include primary particles, but preferably include more aggregates (secondary particles). In particular, the hydrophobic oxide fine particles preferably form a porous layer with a three-dimensional network structure. That is, a porous layer having a three-dimensional network structure formed from hydrophobic oxide fine particles is preferably laminated on thermoplastic resin layer 2.

When particulate filler is included in the thermoplastic resin layer of the first invention, bumps and indentations are formed in a cross-sectional view of the surface of the thermoplastic resin layer (surface with attaching hydrophobic oxide fine particles), and it is thought that non-adhesive properties are maintained for a long period because the hydrophobic fine particles are lodged, in the form of aggregates, in these indentations. That is, excellent non-adhesive properties can be sustained even if there is contact with machinery and equipment during processing as well as with the contents because the hydrophobic oxide fine particles lodged in these indentations are maintained in a fixed state, effectively reducing or preventing detachment of the hydrophobic oxide fine particles. In other words, good non-adhesive properties can be obtained over a relatively long period of time.

Figure 2:
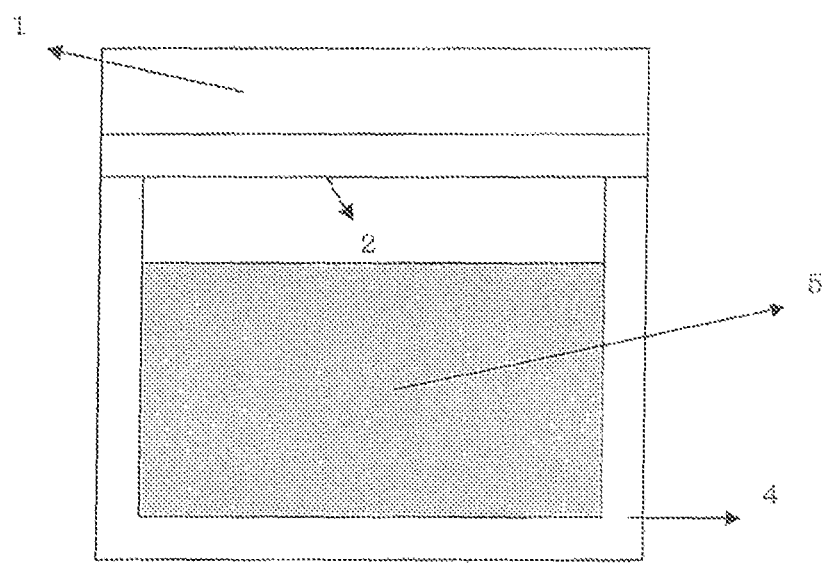
FIG. 2 is a view of the cross-sectional structure of a package body prepared using the multilayer body of the first invention as the lid of a container.

FIG. 2 shows the cross-sectional structure of a package body prepared using the multilayer body of the first invention as the lid of a container. Hydrophobic oxide fine particles 3 and particulate filler 6 is not marked in FIG. 2. Container 4 is filled with contents 5, and sealed with the opening of the container in contact with thermoplastic resin layer 2 of the multilayer body. That is, the multilayer body (packaging material) of the present invention is used in such a way that the hydrophobic oxide fine particles attaching to thermoplastic resin layer 2 can contact contents 5. Even under these circumstances, thermoplastic resin layer 2 is protected by the hydrophobic oxide fine particles, giving it excellent non-adhesive properties, so that even it the contents make contact near (approach) thermoplastic resin layer 2, adherence of the contents to the thermoplastic resin layer is blocked by the hydrophobic oxide fine particles (or a porous layer of the hydrophobic oxide fine particles), which actually repel the contents. Thus, the contents do not remain adhering near the thermoplastic resin layer, but are repelled by the hydrophobic oxide fine particles (or a porous layer consisting of hydrophobic oxide fine particles) and return to the inside of the container. The material of container 4 can be selected from metal, synthetic resin, glass, paper and composites of these and the like, and the type, composition and the like of the thermoplastic resin layer can be adjusted appropriately according to the material used.

Thermoplastic Resin (Layer)

A known thermoplastic resin can be adopted for the thermoplastic resin. For example, acrylic resin, polystyrene, ABS resin, vinyl chloride resin, polyethylene resin, polypropylene resin, polyamide resin, polycarbonate, polyacetal, fluorine resin, silicon resin, polyester resin or the like or a blended resin of these or a copolymer or modified resin or the like containing a mixture of their constituent monomers can be used.

The thickness of the thermoplastic resin layer is not particularly limited, but is preferably about 0.01 μm to 5 mm or more preferably about 0.01 μm to 2 mm from the standpoint of productivity, cost and the like. When the thermoplastic resin layer functions as a thermal adhesive layer, a thickness of 1 to 150 µm is preferably for thermal adhesion purposes. In particular, in the packaging material of the present invention thermal adhesion can be accomplished because the hydrophobic oxide fine particles in the region of thermal adhesion become embedded in the thermoplastic resin layer during the thermal adhesion process, making the thermoplastic resin layer the outermost surface. Therefore, within the range of thickness given above the thickness is preferably set so that the maximum possible number of hydrophobic oxide fine particles can be embedded in the thermoplastic resin layer.

The content of the thermoplastic resin in the thermoplastic resin layer will differ depending on the type of thermoplastic resin and on whether particulate filler and other additives are used, but is normally 20 to 100 wt % or preferably 30 to 99 wt % or more preferably 50 to 99 wt %.

In the present invention, another layer (called a base layer) can be laminated as necessary on the thermoplastic resin (layer) with the aim of reinforcing the thermoplastic resin (layer) or conferring other properties (moisture permeation resistance, oxygen permeation resistance, light shielding, heat insulation, shock resistance, etc.). In this case, a three-layer structure with the base layer, thermoplastic resin layer and hydrophobic oxide fine particles layered in that order as shown in FIG. 1 can normally be employed.

When a base layer is used, a known material can be used for the base layer. Desirable examples include single materials such as paper, synthetic paper, resin film, resin film with a vapor deposited layer, synthetic resin board, aluminum foil, other metal foils, metal plates, woven cloth, nonwoven cloth, leather, synthetic leather, wood, glass plates and the like, as well as composites and laminates of these.

Various layers used in known packaging materials, construction materials, clothing materials, household articles and the like can also be laminated at any location on the base layer. Examples include printing layers, print protection layers (known as OP layers), coloring layers, adhesive layers, adhesive reinforcing layers, primer coat layers, anchor coat layers, anti-slip layers, lubricant layers, anti-fog layers and the like.

The method of laminating the base layer and the method of laminating the base layer and thermoplastic resin layer are not particularly limited, and known methods such as dry lamination, extrusion lamination, wet lamination, heat lamination and the like can be employed.

When the thermoplastic resin layer functions as a thermal adhesive layer or heat seal layer, a known thermal adhesive material can be used. For example, in addition to known sealant films, it is possible to use a layer formed from a known lacquer type adhesive, easy-peel adhesive, hot melt adhesive or other adhesive. That is, in this Description the term "thermoplastic resin" encompasses known thermal adhesives containing resin components. Of these, a lacquer type adhesive or hot melt adhesive is particularly desirable in the first invention, and a thermal adhesive layer formed from a lacquer type adhesive is especially desirable. Forming a hot melt layer facilitates continuous production of the multilayer body (or packaging material) of the first invention because the hydrophobic oxide fine particles can be made to attach as is to the thermal adhesive layer if they are applied after the hot melt adhesive is applied in a molten state but before it cools and solidifies.

Particulate Filler

In the first invention, particulate filler can be included as necessary in the thermoplastic resin material. By dispersing particulate filler in the thermoplastic resin layer, it is possible to give greater abrasion resistance and the like to the thermoplastic resin layer.

Particulate filler comprising at least one of an organic component and an inorganic component can be used as the particulate filler.

For example, 1) aluminum, copper, iron, titanium, silver, calcium and other metals or alloys or intermetallic compounds containing these, 2) silicon oxide, aluminum oxide, zirconium oxide, titanium oxide, iron oxide and other oxides, 3) calcium phosphate, calcium stearate and other inorganic acid salts or organic acid salts, 4) glass and 5) aluminum nitride, boron nitride, silicon carbide, silicon nitride and other ceramics and the like can be used by preference as inorganic components.

For example, acrylic resin, urethane resin, melamine resin, amino resin, epoxy resin, polyethylene resin, polystyrene resin, polypropylene resin, polyester resin, cellulose resin, vinyl chloride resin, polyvinyl alcohol, ethylene-vinyl acetate copolymer, ethylene-vinyl alcohol copolymer, ethylene-ethyl acrylate copolymer, polyacrylonitrile, polyamide and other organic polymer components (or resin components) can be used by preference as organic components.

Particles of an inorganic component, particles of an organic component, or particles containing both an inorganic component and an organic component can be used for the particulate filler of the first invention. Of these, it is especially desirable to use at least one of acrylic resin particles, hydrophilic silica particles, calcium phosphate particles, charcoal powder, fired calcium particles, unfired calcium particles, calcium stearate particles and the like.

The average particle diameter (according to laser particle size distribution analysis) of the particulate filler is preferably 0.5 to 100 µm, or more preferably 1 to 50 µm, or still more preferably 5 to 30 µm. A size below 0.5 µm is unsuitable for handling purposes and for forming the bumps and indentations described above and the like. A size above 100 µm is undesirable from the standpoint of dispersibility, detachment of the particulate filler and the like.

The form of the particulate filler is not limited, and may be spherical, spheroid, indeterminate form, teardrop, flake, hollow, porous or the like.

The content of the particulate filler in the thermoplastic resin layer can be varied appropriately according to the types of thermoplastic resin and particulate filler, the desired physical properties and the like, but in general is preferably 1 to 80 wt % based on the weight of the solids, or more preferably 3 to 50 wt %.

When particulate filler are included, they are commonly compounded with the raw materials for forming the thermoplastic resin layer (composition including thermoplastic resin), although this is not a limitation. The mixing method can be either dry mixing or wet mixing. Because the principal components of the thermoplastic resin layer are generally 1) a thermoplastic resin or its constituent monomers or oligomers, 2) a solvent and 3) a crosslinking agent as necessary, the particulate filler can be added and mixed with a mixture of these.

Hydrophobic Oxide Fine Particles

The hydrophobic oxide fine particles attaching to the thermoplastic resin layer have an average primary particle diameter of normally 3 to 100 nm or preferably 5 to 50 nm or more preferably 5 to 20 nm. If the average primary particle diameter is within this range, the hydrophobic oxide fine particles aggregate to a suitable degree so that air and other gasses can be retained in gaps in these aggregates, resulting in superior non-adhesive properties. That is, superior non-adhesive properties can be achieved because this aggregate state persists even after the particles have attached to the thermoplastic resin layer. In the present invention, the hydrophobic oxide fine particles can be made to attach to one surface or both surfaces of the thermoplastic resin (layer).

In the first invention, the average primary particle diameter can be measured with a scanning electron microscope (FE-SEM), which can also be used in combination with another electron microscope such as a transmission electron microscope if the resolution of the scanning electron microscope is too low. Specifically, taking the particle diameter when the particles are spherical and the average of the longest axis and shortest axis as the diameter when they are non-spherical, the average primary particle diameter is the average of the diameters of 20 randomly-selected particles observed by scanning electron microscopy or the like.

The specific surface area (BET method) of the hydrophobic oxide fine particles is not particularly limited, but is normally 50 to 300 $m^2/g$ or preferably 100 to 300 $m^2/g$.

The hydrophobic oxide fine particles are not especially limited as long as they have hydrophobic properties, and may be particles that have been made hydrophobic by surface treatment. For example, they may be hydrophilic oxide fine particles that have been surface treated with a silane coupling agent to make the surfaces hydrophobic. The type of oxide is not especially limited as long as it has hydrophobic properties. For example, at least one of silica (silicon dioxide), alumina, and titania or the like can be used. A known commercial product can be adopted in this case. Examples of silica include the products Aerosil R972, Aerosil R972V, Aerosil R972CF, Aerosil R974, Aerosil RX200 and Aerosil RY200 (Japan Aerosil) and Aerosil R202, Aerosil R805, Aerosil R812 and Aerosil R812S (Evonik Degussa). Examples of titania include the product Aeroxide $TiO_2$ T805 (Evonik Degussa) and the like. Examples of alumina include fine particles such as Aeroxide Alu C (Evonik Degussa) and the like that have been made hydrophobic by surface treatment with a silane coupling agent.

Of these, hydrophobic silica fine particles can be used by preference. From the standpoint of obtaining superior non-adhesive properties, hydrophobic silica fine particles having surface trimethylsilyl groups are especially desirable. Examples of corresponding commercial products include the aforementioned Aerosil R812 and Aerosil R812S (both from Evonik Degussa) and the like.

The amount (dried weight) of hydrophobic oxide fine particles attaching to the thermoplastic resin layer is not particularly limited, but is preferably 0.01 to 10 $g/m^2$ or more preferably 0.2 to 1.5 $g/m^2$ or still more preferably 0.2 to 1 $g/m^2$. Within this range it is possible not only to obtain superior and lasting non-adhesive properties, but also to control costs and prevent detachment of the hydrophobic oxide fine particles. The hydrophobic oxide fine particles attaching to the thermoplastic resin layer preferably form a porous layer having a three-dimensional network structure and a thickness of preferably about 0.1 to 5 μm or more preferably about 0.2 to 2.5 μm. When the particles attach in such a porous layered state, more air can be included in the layer, resulting in superior non-adhesive properties.

The hydrophobic oxide fine particles may attach to the entire surface of the thermoplastic resin layer (entire surface opposite the base layer), or may attach to a region that excludes the region of thermal adhesion of the thermoplastic layer (the margin to adhere). In the present invention, even when the particles attach to the entire surface of the thermoplastic resin layer, most or all of the hydrophobic oxide fine particles in the region of thermal adhesion do not interfere with thermal adhesion because they become embedded in the thermoplastic resin layer, and adherence to the entire surface of the thermoplastic resin layer is desirable from the standpoint of industrial productivity.

Packaging Material and Other Applications

The multilayer body of the first invention can be used in packaging materials and in a variety of other applications, either as is or after further processing. The other applications may be any requiring non-adhesive properties, soil resistance, water repellency and the like, without any particular limitations, and examples include tablecloths, napkins, aprons, table covers, floor mats, wall coverings, wallpaper, labels, release paper, tags, char covers, water resistant sheets, umbrellas, ski wear, construction materials, bed covers, shoe surface materials, shoe covers, waterproof clothing, water repellant films, water repellant sheets and the like.

2. Method of Manufacturing Multilayer Body and Packaging Material

The multilayer body (packaging material) of the first invention can preferably be obtained for example by a method of manufacturing a multilayer body or packaging material having at least a thermoplastic resin layer, wherein the manufacturing method includes a step (hereunder sometimes called the "adherence step") whereby hydrophobic fine particles with an average primary particle diameter of 3 to 100 nm are made to attach to the surface of the thermoplastic resin layer.

The thermoplastic resin layer can be used as is if it is a film or sheet. A known base layer can also be laminated by known methods as necessary. For example, the thermoplastic resin layer can be formed by the methods explained in 1. above on a monolayer base or on a laminate material prepared by dry lamination, extrusion lamination, wet lamination, heat lamination or the like. When particulate filler are used, they can be included in advance in the raw material for forming the thermoplastic resin layer as explained above.

The method used in the hydrophobic oxide fine particle adherence step is not particularly limited. For example, a known method such as roll coating, gravure coating, bar coating, doctor blade coating, brush painting or electrostatic powder coating can be used. When roll coating or the like is used, a coat can be formed on the thermoplastic resin layer using a dispersion of the hydrophobic oxide fine particles dispersed in a solvent, and dried to accomplish the adherence step. The solvent in this case is not limited and may be water or an organic solvent such as alcohol (ethanol), cyclohexane, toluene, acetone, IPA, propylene glycol, hexylene glycol, butyl diglycol, pentamethylene glycol, normal pentane, normal hexane, hexyl alcohol or the like. In this case, a trace amount of a dispersant, colorant, antisettling agent, viscosity adjuster or the like can also be included. The dispersed amount of the hydrophobic oxide fine particles in the solvent can normally be about 10 to 100 g/L. When drying is used, it may be natural drying or forced drying (heat drying), but forced drying is preferred for industrial purposes. The drying temperature is not limited as long as it does not affect the thermoplastic resin layer, but is normally 150° C. or less or preferably 80 to 120° C.

In the manufacturing method of the first invention, the multilayer body can also be heated during and/or after the aforementioned adherence step. The strength of adherence (fixing strength) of the hydrophobic oxide fine particles on the thermoplastic resin layer can be further increased by heating the multilayer body. In this case, the heating temperature T can be set appropriately according to the type of thermoplastic resin layer and the like, but normally it is preferably within the range of $Tm-50 \leq T \leq Tm+50$ given Tm as the melting point (melting initiation temperature) ° C. of the thermoplastic resin layer.

A multilayer body obtained in this way can be used as a packaging material either as is or after further processing. The processing method can be a known method similar to those used in known packaging materials. Examples include embossing, half cutting, notching and the like.

Second Invention

1. Non-Adhesive Container

The non-adhesive container of the second invention is a container for holding contents, wherein hydrophobic oxide fine particles having an average primary particle diameter of 3 to 100 nm attach to part or all of at least a surface of the container that comes into contact with the contents.

The container body of the second invention can be any for the purpose of holding contents, and may be a known container or commercial product. The material thereof is also not limited, and may be a glass container, ceramic container, paper container, plastic container, metal container or wood container, or a container made of a composite of two or more of these. The form of the container body may be a known form, such as a dish, tray, bag, cup, bottle, pot, box, barrel, rough cylinder, wrapper (wrapping sheet) or the like. A container consisting of a formed body can be used favorably for the container body. This can be a container consisting of formed paper, plastic or metal for example. Another example of a container body is one composed of a laminate material including a layer of a rigid material. Preferably, "a packaging material consisting of a multilayer body having at least a base layer and a thermal adhesive layer, wherein the thermal adhesive layer is laminated as the outermost layer of one surface of the packaging material, and hydrophobic oxide fine particles having an average primary particle diameter of 3 to 100 nm attach to the outside surface where the thermal adhesive layer does not adjoin another layer" is excluded as a non-adhesive container in the second invention.

The non-adhesive container of the second invention features hydrophobic oxide fine particles having an average primary particle diameter of 3 to 100 nm attaching to part or all of at least a surface of the container that comes into contact with the contents. In this case, the hydrophobic oxide fine particles may attach to surfaces of the container body that do not come into contact with the contents, and may attach to the entire surface of the container (entire surface including surfaces that do not come into contact with the contents). They may contact part of a surface that comes into contact with the contents, or may attach to all of this surface (the entire surface).

The hydrophobic oxide fine particles attaching to the non-adhesive container of the second invention are almost invisible to the naked eye, and are therefore transparent or semi-transparent. As a result, when a transparent glass container or nearly transparent plastic container is used as the container body, its transparency is maintained even after adherence of the hydrophobic oxide fine particles. In addition, when the inner surface of the container has a picture, pattern or the like, this picture, pattern or the like can be seen through the hydrophobic oxide fine particles (or layer thereof).

The multilayer body comprising a thermoplastic resin layer containing particulate filler of the first invention can also be used in the second invention. That is, this includes an invention featuring a container composed of a multilayer body comprising a thermoplastic resin layer containing particulate filler, wherein hydrophobic oxide fine particles attach to part or all of at least a surface of the container that comes into contact with the contents.

With such a container, good water repellency and non-adhesive properties can be more effectively maintained as in the first invention if a thermoplastic resin already containing particulate filler is used for the part to which the hydrophobic oxide fine particles will attach for example, and the thermoplastic resin layer is then formed by a method such as in-molding, coating, thermal spraying, spraying, transfer printing, press fitting, bonding or the like. The thermoplastic resin and particulate filler may be as in the first invention. That is, a thermoplastic resin (layer) and particulate filler similar to those described for the first invention can be employed, and those within the preferred ranges described with respect to the first invention can be used by preference.

The region on which the thermoplastic resin layer containing particulate filler is formed is not particularly limited. For example, this may be 1) only the region to which the hydrophobic oxide fine particles will attach, 2) a region including parts to which the hydrophobic oxide fine particles will not attach, or 3) the entire surface (entire inner surface) of the container or the like.

Figure 4:
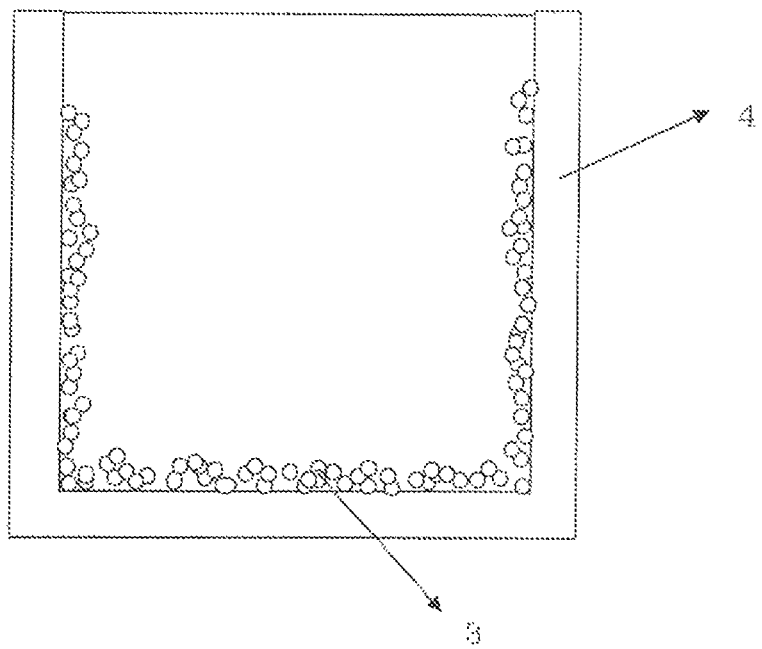
FIG. 4 is a view of the cross-sectional structure of the non-adhesive container of the second invention.

FIG. 4 shows a cut-away section of the non-adhesive container of the second invention. In the non-adhesive container of FIG. 4, hydrophobic oxide fine particles 3 having an average primary particle diameter of 3 to 100 nm attach to the surfaces (bottom and part of the side surfaces) on the side of container body 4 that holds the contents. Hydrophobic oxide fine particles 3 are fixed by adherence to container body 4. That is, the hydrophobic oxide fine particles attach sufficiently that they will not detach even when they come into contact with the contents. In FIG. 4, hydrophobic oxide fine particles 3 may include primary particles, but preferably include more aggregates (secondary particles). In particular, the hydrophobic oxide fine particles preferably form a porous layer having a three-dimensional network structure. Namely, a porous layer with a three-dimensional network structure formed from hydrophobic oxide fine particles is preferably laminated on at least part of the surface of container body 4.

Figure 5:
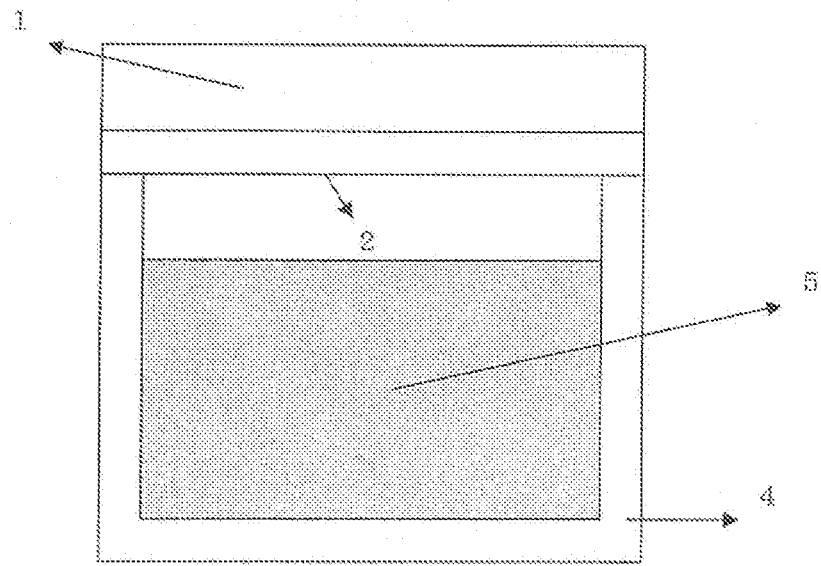
FIG. 5 is a view of the cross-sectional structure of the non-adhesive container of the second invention after it has been filled with contents and thermally sealed with a lid.

FIG. 5 is a view of the cross-sectional structure of a product comprising the non-adhesive container of the second invention in which contents have been packed and sealed by thermally bonding a lid. Hydrophobic oxide fine particles 3 are not shown in FIG. 5. Contents 5 are packed in container 4 and sealed with the opening of the container in contact with thermally adhesive layer 2 of the lid. In this case, even if there are hydrophobic oxide fine particles attaching to the surface of the opening of the container, the hydrophobic oxide fine particles in the region of thermal adhesion become embedded in the thermal adhesive layer during the thermal adhesion process, and thermal adhesion is possible because the thermal adhesive layer and container body 4 are in direct contact with one another. When container body 4 is made of thermoplastic plastic, moreover, it can be welded together with a lid of the same kind of plastic.

The material of the lid is not particularly limited, and a known material or laminate material can be used, and can be selected appropriately according to the material of container body 4 and the desired characteristics. For example, single materials such as paper, synthetic paper, resin film, resin film with a vapor deposited layer, aluminum foil and the like and composites and laminates of these can be used by preference.

Various layers used in known lids can be laminated at any location on these materials. Examples include printing layers, print protection layers (so called OP layers), coloring layers, thermal adhesive layers, adhesive layers, adhesive reinforcing layers, primer coat layers, anchor coat layers, anti-slip layers, lubricant layers, anti-fog layers and the like.

A thermally adhesive lid is used in FIG. 5, but this is not a limitation, and another known type can be used. For example, a fitted lid, screw lid, wrap film, heat-shrink film, swaged lid, cap or the like can also be selected appropriately. Of course, hydrophobic oxide fine particles can also be made to attach to the inner and/or outer surfaces of these lids.

The hydrophobic oxide fine particles attaching to container body 4 have an average primary particle diameter of 3 to 100 nm or preferably 5 to 50 nm or more preferably 5 to 20 nm. When the average primary particle diameter is within this range, the hydrophobic oxide fine particles aggregate to a suitable degree so that air and other gasses can be retained in gaps in these aggregates, resulting in superior non-adhesive properties. That is, superior non-adhesive properties can be achieved because this aggregate state is maintained even after the particles have attached to the container body.

In the second invention, the average primary particle diameter can be measured with a scanning electron microscope (FE-SEM), which can also be used in combination with another electron microscope such as a transmission electron microscope if the resolution of the scanning electron microscope is low. Specifically, taking the particle diameter when the particles are spherical and the average of the longest axis and shortest axis as the diameter when they are non-spherical, the average primary particle diameter is the average of the diameters of 20 randomly-selected particles observed in scanning electron microscopy or the like.

The specific surface area (BET method) of the hydrophobic oxide fine particles is not particularly limited, but is normally 50 to 300 $m^2/g$ or preferably 100 to 300 $m^2/g$.

The hydrophobic oxide fine particles are not especially limited as long as they have hydrophobic properties, and may be particles that have been made hydrophobic by surface treatment. For example, they may be hydrophilic oxide fine particles that have been surface treated with a silane coupling agent to make the surfaces hydrophobic. The type of oxide is not especially limited as long as it has hydrophobic properties. For example, at least one of silica (silicon dioxide), alumina, and titania or the like can be used. A known commercial product can be used in this case. Examples of silica include the products Aerosil R972, Aerosil R972V, Aerosil R972CF, Aerosil R974, Aerosil RX200 and Aerosil RY200 (Japan Aerosil) and Aerosil R202, Aerosil R805, Aerosil R812 and Aerosil R812S (Evonik Degussa). Examples of titania include the product Aeroxide $TiO_2$ T805 (Evonik Degussa) and the like. Examples of alumina include fine particles such as Aeroxide Alu C (Evonik Degussa) and the like that have been made hydrophobic by surface treatment with a silane coupling agent.

Of these, hydrophobic silica fine particles can be used by preference. From the standpoint of obtaining superior non-adhesive properties, hydrophobic silica fine particles having trimethylsilyl groups on the surface of the particle are especially desirable. Examples of corresponding commercial products include the aforementioned Aerosil R812 and Aerosil R812S (both from Evonik Degussa) and the like.

The amount (dried weight) of hydrophobic oxide fine particles attaching to the container body is not particularly limited, but is normally 0.01 to 10 $g/m^2$ or preferably 0.2 to 1.5 $g/m^2$ or more preferably 0.3 to 1 $g/m^2$. Within this range it is not only possible to obtain superior and lasting non-adhesive properties, but also to control costs and prevent detachment of the hydrophobic oxide fine particles. The hydrophobic oxide fine particles attaching to container body 4 preferably form a porous layer having a three-dimensional network structure and a thickness of preferably about 0.1 to 5 μm or more preferably about 0.2 to 2.5 μm. When the particles attach in such a porous layered state, more air can be included in the layer, resulting in superior non-adhesive properties.

2. Method of Manufacturing Non-Adhesive Container

The non-adhesive container of the second invention can preferably be obtained by a manufacturing method that comprises a step of causing hydrophobic oxide fine particles having an average primary particle diameter of 3 to 100 nm to attach to part or all of at least a surface of the container body that comes into contact with the contents.

As discussed above, a known container can be used for the container body. The method for the attaching step is not particularly limited. For example a known method such as dipping, brush painting, roll coating, electrostatic powder coating or the like can be used. In the case of dipping, brush painting or roll coating, the attaching step can be carried out by forming a coat on the container body using a dispersion of the hydrophobic oxide fine particles dispersed in a solvent and drying the coat. The solvent in this case is not particularly limited, and water or an organic solvent such as alcohol (ethanol), cyclohexane, toluene, acetone, IPA, propylene glycol, hexylene glycol, butyl diglycol, pentamethylene glycol, normal pentane, normal hexane, hexyl alcohol or the like can be selected appropriately. In this case, a trace amount of a dispersant, colorant, antisettling agent, viscosity adjuster or the like can also be included. The dispersed amount of the hydrophobic oxide fine particles in the solvent can normally be about 10 to 100 g/L. When drying is performed, it may be natural drying or forced drying (heat drying), but forced drying is preferred for industrial purposes. The drying temperature depends partly on the container material and is not particularly limited, but normally 250° C. or less or especially 120 to 200° C. is preferred for achieving lasting non-adhesive properties.

In the manufacturing method of the second invention, the container body can also be heated during and/or after the aforementioned adherence step. The strength of adherence (fixing strength) of the hydrophobic oxide fine particles on the thermoplastic resin layer can be further increased by heating the multilayer body. The heating temperature in this case is not particularly limited, but can normally be about 120 to 200° C.

The manufacturing method of the second invention can also include a step of forming a thermoplastic resin layer containing particulate filler before the step of causing adherence of the hydrophobic oxide fine particles. For example, it may include a step of forming a thermoplastic resin layer by a method such as in-molding, coating, thermal spraying, spraying, transfer printing, press fitting, bonding or the like using a thermoplastic resin composition containing particulate filler on the part of the non-adhesive container to which the hydrophobic oxide fine particles will attach. The hydrophobic oxide fine particles can be made to attach to the surface of the formed layer by means of the aforementioned adherence step. A non-adhesive container capable of effectively maintaining good water repellency and non-adhesive properties can be provided in this way. The thermoplastic resin and particulate filler can be as described for the first invention. In fact, the thermoplastic resin and particulate filler can be identical to those used in the first invention, and are preferably within the desirable ranges described for the first invention.

The area on which the thermoplastic resin layer containing particulate filler is formed is not limited. For example, it may be that part to which the hydrophobic oxide fine particles will attach, or may include a part to which the hydrophobic oxide fine particles will not attach, or may be the entire surface of the container.

Third Invention
1. Packaging Material

The packaging material of the third invention is a packaging material consisting of a multilayer body having at least a base layer and a thermal adhesive layer, wherein the thermal adhesive layer is laminated as the outermost layer on one surface of the packaging material, and hydrophobic oxide fine particles having an average primary particle diameter of 3 to 100 nm attach to the outside surface where the thermal adhesive layer does not adjoin any other layer.

Figure 6:
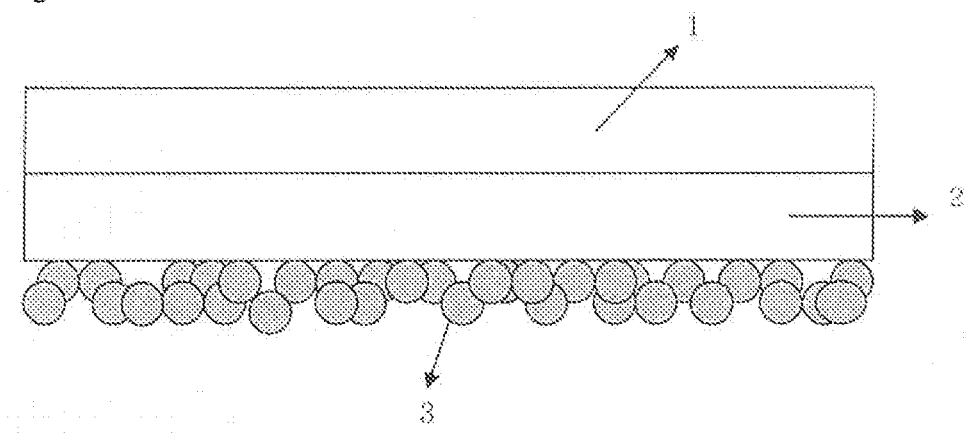
FIG. 6 is a view of the cross-sectional structure of the packaging material of the third invention.

FIG. 6 is a view of the cross-sectional structure of the packaging material of the third invention. The packaging material of FIG. 6 consists of a multilayer body having thermal adhesive layer 2 laminated on base layer 1. Thermal adhesive layer 2 is laminated on the outermost layer of one side of the packaging material (multilayer body). In thermal adhesive layer 2, which is the outermost layer, hydrophobic oxide fine particles 3 having an average primary particle diameter of 3 to 100 nm attach to the surface (outermost surface) on the side not adjoining another layer (base layer in FIG. 6). Hydrophobic oxide fine particles 3 are fixed by adherence to thermal adhesive layer 2. That is, the hydrophobic oxide fine particles attach so that they do not detach even if they come into contact with the contents. In FIG. 6, hydrophobic oxide fine particles 3 may include primary particles, but preferably include more aggregates (secondary particles). In particular, the hydrophobic oxide fine particles preferably form a porous layer having a three-dimensional network structure. That is, a porous body having a three-dimensional network structured formed of hydrophobic oxide fine particles is preferably laminated on thermal adhesive layer 2.

Figure 7:
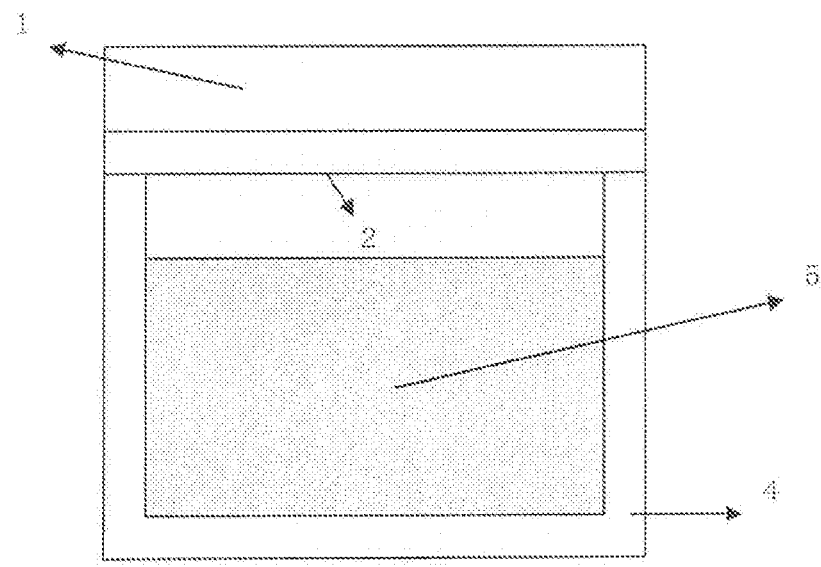
FIG. 7 is a view of the cross-sectional structure of a package body prepared using the packaging material of the third invention as the lid of a container.

FIG. 7 shows the cross-sectional structure of a package body prepared using the packaging material of the third invention as the lid material of a container. Hydrophobic oxide fine particles 3 are not shown in FIG. 7. Container 4 has been filled with contents 5, and sealed with the opening of the container in contact with thermal adhesive layer 2 of the packaging material. That is, the packaging material of the third invention is used in such a way that the hydrophobic oxide fine particles attaching to thermal adhesive layer 2 can contact contents 5. Even under these circumstances, thermal adhesive layer 2 is protected by the hydrophobic oxide fine particles, providing superior non-adhesive properties, so that even if the contents make contact near (approach) thermal adhesive layer 2, adherence of the contents to the thermal adhesive layer is blocked by the hydrophobic oxide fine particles (or a porous layer of these hydrophobic oxide fine particles), which actually repel the contents. Thus, the contents do not remain adhering near the thermal adhesive layer, but are repelled by the hydrophobic oxide fine particles (or a porous layer consisting of hydrophobic oxide fine particles) and return to the inside of the container. The material of container 4 can be selected from metal, synthetic resin, glass, paper and composites of these and the like, and the type, composition and the like of the thermoplastic resin can be adjusted appropriately according to the material used. Thus, the packaging material of the third invention can be used favorably for a product comprising contents packaged in a packaging material in such a way that the outside surface of the thermal adhesive layer (particularly the hydrophobic oxide fine particles (or a porous layer of the hydrophobic oxide fine particles)) can contact the contents.

A known material or laminate material can be used for the base layer. For example, paper, synthetic paper, resin film, resin film with a vapor deposited layer, aluminum foil or the like, and composites and layered materials of these can be used favorably.

Various layers used in known packaging materials can also be laminated at any location on these materials. Examples include printing layers, print protection layers (OP layers), coloring layers, adhesive layers, adhesive reinforcing layers, primer coat layers, anchor coat layers, anti-slip layers, lubricant layers, anti-fog layers and the like.

When a multilayer material is used the lamination method is not particularly limited, and a known method such as dry lamination, extrusion lamination, wet lamination, heat lamination or the like can be used.

The thickness of the base layer is not particularly limited, and may be set appropriately within the range of normally 15 to 500 μm depending on the strength, flexibility, cost and the like of the packaging material.

A known material can be used for the thermal adhesive layer. For example, in addition to known sealant films, it is possible to use a layer formed from a known adhesive such as lacquer type adhesive, easy-peel adhesive, hot melt adhesive or other adhesive. Of these, a lacquer type adhesive or hot melt adhesive is preferred in the present invention, and a thermal adhesive layer formed from a hot melt adhesive (hot melt layer) is especially desirable. Forming a hot melt layer facilitates continuous production of the packaging material of the third invention because the hydrophobic oxide fine particles can be made to attach as is to the thermal adhesive layer if they are applied after the hot melt adhesive is applied in a molten state but before it cools and solidifies.

The thickness of the thermal adhesive layer is not particularly limited, but is preferably about 2 to 150 μm from the standpoint of sealing properties, productivity, cost and the like. In particular, thermal adhesion is possible in the present invention because the hydrophobic oxide fine particles present in the region of thermal adhesion can sink into the thermal adhesive layer during the thermal adhesion process, so that the thermal adhesive layer becomes the outside surface. Therefore, within the range of thickness given above the thickness is preferably set so that the maximum possible number of hydrophobic oxide fine particles can be embedded in the thermoplastic resin layer.

The hydrophobic oxide fine particles have an average primary particle diameter of normally 3 to 100 nm or preferably 5 to 50 nm or more preferably 5 to 20 nm. If the average primary particle diameter is within this range, the hydrophobic oxide fine particles will aggregate to a suitable degree so that air or other gasses can be retained within gaps in the aggregates, resulting in superior non-adhesive properties. That is, superior non-adhesive properties can be obtained because this aggregate state persists even after the particles have attached to the thermoplastic resin layer.

In the third invention, the average primary particle diameter can be measured with a scanning electron microscope (FE-SEM), which can also be used in combination with another electron microscope such as a transmission electron microscope if the resolution of the scanning electron microscope is too low. Specifically, taking the particle diameter when the particles are spherical and the average of the longest axis and shortest axis as the diameter when they are non-spherical, the average primary particle diameter is the average of the diameters of 20 randomly-selected particles observed in scanning electron microscopy or the like.

The specific surface area (BET method) of the hydrophobic oxide fine particles is not particularly limited, but is normally 50 to 300 $m^2/g$ or preferably 100 to 300 $m^2/g$.

The hydrophobic oxide fine particles are not especially limited as long as they have hydrophobic properties, and may be particles that have been made hydrophobic by surface treatment. For example, they may be hydrophilic oxide fine particles that have been surface treated with a silane coupling agent to make the surfaces hydrophobic. The type of oxide is also not especially limited as long as it has hydrophobic properties. For example, at least one of silica (silicon dioxide), alumina, and titania or the like can be used. A known commercial product can be adopted in this case. Examples of silica include the products Aerosil R972, Aerosil R972V, Aerosil R972CF, Aerosil R974, Aerosil RX200 and Aerosil RY200 (Japan Aerosil) and Aerosil R202, Aerosil R805, Aerosil R812 and Aerosil R812S (Evonik Degussa). Examples of titania include the product Aeroxide $TiO_2$ T805 (Evonik Degussa) and the like. Examples of alumina include fine particles such as Aeroxide Alu C (Evonik Degussa) and the like that have been made hydrophobic by surface treatment with a silane coupling agent.

Of these, hydrophobic silica fine particles can be used by preference. From the standpoint of obtaining superior non-adhesive properties, hydrophobic silica fine particles having trimethylsilyl groups on the surface of the particle are especially desirable. Examples of corresponding commercial products include the aforementioned Aerosil R812 and Aerosil R812S (both from Evonik Degussa) and the like.

The amount (dried weight) of hydrophobic oxide fine particles attaching to the thermal adhesive layer is not particularly limited, but is preferably 0.01 to 10 $g/m^2$ or more preferably 0.2 to 1.5 $g/m^2$ or still more preferably 0.3 to 1 $g/m^2$. Within this range it is not only possible to obtain superior and lasting non-adhesive properties, but also to control costs and prevent detachment of the hydrophobic oxide fine particles. The hydrophobic oxide fine particles attaching to the thermal adhesive layer preferably form a porous layer having a three-dimensional network structure and a thickness of preferably about 0.1 to 5 µm or more preferably about 0.2 to 2.5 µm. When the particles attach in such a porous layered state, more air can be included in the layer, resulting in superior non-adhesive properties.

The hydrophobic oxide fine particles may attach to the entire surface of the thermal adhesive layer (entire surface opposite the base layer), or may attach to a region that excludes the region of thermal adhesion of the thermal adhesive layer (the margin to adhere). In the present invention, even when the particles attach to the entire surface of the thermal adhesion layer, most or all of the hydrophobic oxide fine particles in the region of thermal adhesion do not interfere with thermal adhesion because they become embedded in the thermoplastic resin layer, so adherence to the entire surface of the thermoplastic resin layer is desirable from the standpoint of industrial productivity.

2. Method of Manufacturing Packaging Material

The packaging material of the third invention can preferably be obtained for example by a method of manufacturing a packaging material consisting of a multilayer body having at least a base layer and a thermal adhesion layer, wherein the packaging material manufacturing method includes a step (hereunder sometimes called the "adherence step") whereby hydrophobic fine particles with an average primary particle diameter of 3 to 100 nm are made to attach to the surface of the thermal adhesive layer.

The method of manufacturing the multilayer body may be a known method. For example, the thermal adhesive layer can be formed by the methods explained in 1. above on a monolayer base or on a laminate material prepared by dry lamination, extrusion lamination, wet lamination, heat lamination or the like.

The method used in the attaching step is not particularly limited. For example, a known method such as roll coating, gravure coating, bar coating, doctor blade coating, brush panting or electrostatic powder coating can be used. When roll coating or the like is used, the attaching step can be carried out by forming a coat on the container body using a dispersion of the hydrophobic oxide fine particles dispersed in a solvent and drying the coat. The solvent in this case is not particularly limited and may be water or an organic solvent such as alcohol (ethanol), cyclohexane, toluene, acetone, IPA, propylene glycol, hexylene glycol, butyl diglycol, pentamethylene glycol, normal pentane, normal hexane, hexyl alcohol or the like. A small amount of a dispersant, colorant, antisettling agent, viscosity adjuster or the like can also be included. The dispersed amount of the hydrophobic oxide fine particles in the solvent can normally be about 10 to 100 g/L. When drying is used, it may be natural drying or forced drying (heat drying), but forced drying is preferred for industrial purposes. The drying temperature is not limited as long as it does not affect the thermal adhesive layer, but is normally 150° C. or less or preferably 80 to 120° C.

In the manufacturing method of the third invention, the multilayer body can also be heated during and/or after the aforementioned attaching step. The strength of adhesion (fixing strength) of the hydrophobic oxide fine particles on the thermal adhesive layer can be further increased by heating the multilayer body. In this case, the heating temperature T can be set appropriately according to the type of thermal adhesive layer or the like, but normally is preferably within the range of Tm−50≤T≤Tm+50 given Tm as the melting point of the thermal adhesive layer used (melting initiation temperature) ° C. The packaging material of the third invention may also be embossed, half-cut, notched or the like as necessary in the same way as known packaging materials.

Fourth Invention

1. Packaging Material

The packaging material of the fourth invention is a packaging material consisting of a multilayer body having at least a base layer and a thermal adhesive layer, wherein the thermal adhesive layer is laminated as the outermost layer on one side of the packaging material, an oxygen absorbent is contained in at least one of the base layer and the thermal adhesive layer, and hydrophobic oxide fine particles having an average primary particle diameter of 3 to 100 nm attach to the outside surface where the thermal adhesive layer does not adjoin layer.

Figure 9:
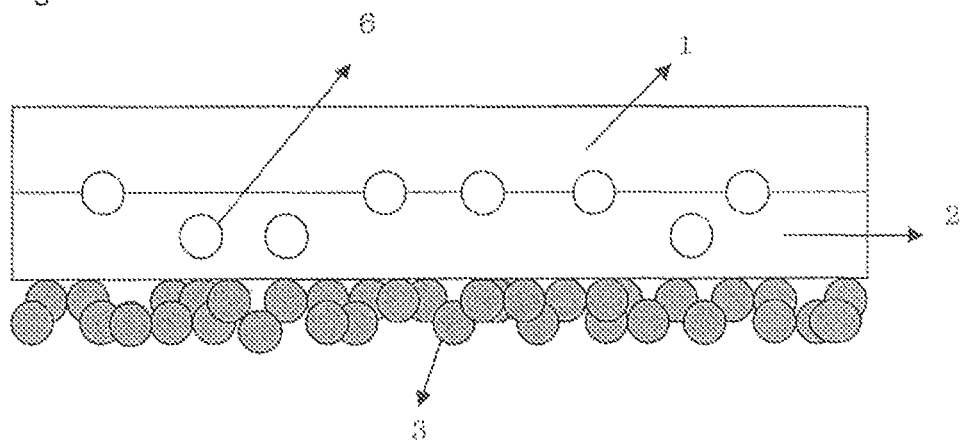
FIG. 9 is a view of the cross-sectional structure of a packaging material of one embodiment of the fourth invention.

FIG. 9 shows a view of the cross-sectional structure of a packaging material of one embodiment of the fourth invention. The packaging material of FIG. 9 consists of a multilayer body having thermal adhesive layer 2 laminated on base layer 1. In this packaging material, thermal adhesive layer 2 is laminated on the outermost layer of one side of the packaging material (multilayer body).

In this packaging material, oxygen absorbent 6 is included in thermal adhesive layer 2. However, some particles of oxygen absorbent 6 may straddle the boundary between base layer 1 and thermal adhesive layer 2. In thermal adhesive layer 2, which is the outermost layer, hydrophobic oxide fine particles 3 having an average primary particle diameter of 3 to 100 nm attach to the surface (outside surface) on the side not adjoining another layer (base layer in FIG. 9). Hydrophobic oxide fine particles 3 are fixed by adherence to thermal adhesive layer 2. That is, the hydrophobic oxide fine particles attach so that they do not separated from the layer even if they come into contact with the contents. In FIG. 9, hydrophobic oxide fine particles 3 may include primary particles, but preferably include more aggregates (secondary particles). In particular, the hydrophobic oxide fine particles preferably form a porous layer having a three-dimensional network structure.

That is, a porous body with a three-dimensional network structured formed of hydrophobic oxide fine particles is preferably laminated on thermal adhesive layer 2.

Figure 10:
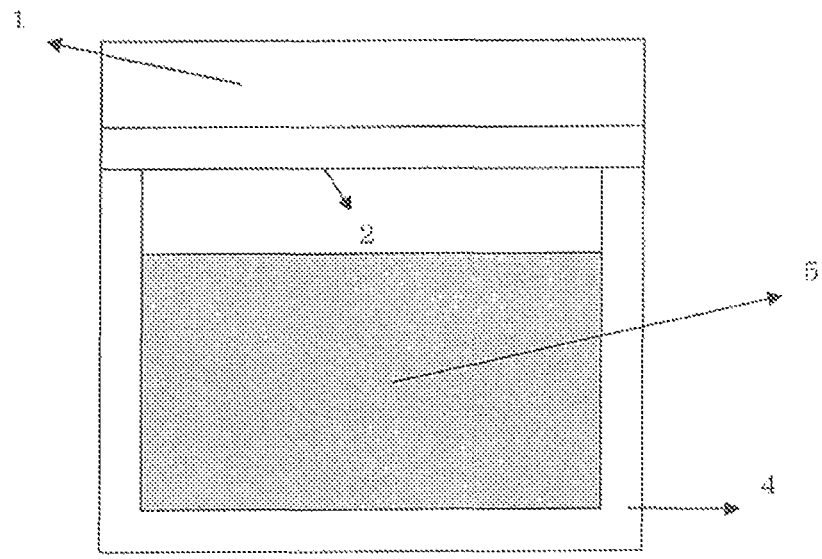
FIG. 10 is a view of the cross-sectional structure of a package body prepared using the packaging material of the fourth invention as the lid of a container.

FIG. 10 is a view of the cross-sectional structure of a package body prepared using the packaging material of the fourth invention as the lid material of a container. Hydrophobic oxide fine particles 3 and oxygen absorbent 6 are not shown in FIG. 10. Container 4 is filled with contents 5, and sealed with the opening of the container in contact with thermal adhesive layer 2 of the packaging material. That is, the packaging material of the fourth invention is used in such a way that the hydrophobic oxide fine particles attaching to thermal adhesive layer 2 can contact contents 5. Even under these circumstances, thermal adhesive layer 2 is protected by the hydrophobic oxide fine particles, providing superior non-adhesive properties, so that even if the contents make contact near (approach) thermal adhesive layer 2, adherence of the contents to the thermal adhesive layer is blocked by the hydrophobic oxide fine particles (or a porous layer of these hydrophobic oxide fine particles), which actually repel the contents. Thus, the contents do not remain adhering near the thermal adhesive layer, but are repelled by the hydrophobic oxide fine particles (or a porous layer consisting of hydrophobic oxide fine particles) and return to the inside of the container. The material of container 4 can be selected from metal, synthetic resin, glass, paper and composites of these and the like, and the type, composition and the like of the thermal adhesive layer can be adjusted appropriately according to the material used.

A known material or laminate material can be used for the base layer. For example, paper, synthetic paper, resin film, resin film with a vapor deposited layer, aluminum foil and other simple materials and composites and laminates of these can be used.

Various layers used in known packaging materials can also be laminated at any location on these materials. Examples include printing layers, print protection layers (so-called OP layers), coloring layers, adhesive layers, adhesive reinforcing layers, primer coat layers, anchor coat layers, anti-slip layers, lubricant layers, anti-fog layers and the like. A resin layer containing the oxygen absorbent described below can also be laminated as necessary.

When a multilayer material is used the lamination method is not particularly limited, and a known method such as dry lamination, extrusion lamination, wet lamination, heat lamination or the like can be used.

The thickness of the base layer is not particularly limited, and may be set appropriately within the range of normally 15 to 500 μm depending on the strength, flexibility, cost and the like of the packaging material.

A known material can be used for the thermal adhesive layer. For example, in addition to known sealant films, it is possible to use a layer formed from a known lacquer type adhesive, easy-peel adhesive, hot melt adhesive or other adhesive for example. Of these, a lacquer type adhesive or hot melt adhesive is preferred in the fourth invention, and a thermal adhesive layer formed from a hot melt adhesive (hot melt layer) can be adopted by preference. Forming a hot melt layer facilitates continuous production of the packaging material of the fourth invention because the hydrophobic oxide fine particles can be made to attach as is to the thermal adhesive layer if they are applied after the hot melt adhesive is applied in a molten state but before it cools and solidifies.

The thickness of the thermal adhesive layer is not particularly limited, but is preferably about 2 to 150 μm from the standpoint of sealing properties, productivity, cost and the like. In particular, thermal adhesion is achieved in the packaging material of the fourth invention because the hydrophobic oxide fine particles present in the region of thermal adhesion can sink into the thermal adhesive layer during thermal adhesion (heat seal), so that the thermal adhesive layer becomes the outside surface. Therefore, within the aforementioned range the thickness is preferably set so that the maximum possible number of hydrophobic oxide fine particles can be embedded in the thermoplastic resin layer.

The hydrophobic oxide fine particles attaching to the thermal adhesive layer have an average primary particle diameter of normally 3 to 100 nm or preferably 5 to 50 nm or more preferably 5 to 20 nm. If the average primary particle diameter is within this range, the hydrophobic oxide fine particles will aggregate to a suitable degree so that air or other gas can be retained within gaps in the aggregates, resulting in superior non-adhesive properties. That is, superior non-adhesive properties can be obtained because this aggregate state persists even after attaching to the thermoplastic resin layer.

In the fourth invention, the average primary particle diameter can be measured with a scanning electron microscope (FE-SEM), which can also be used in combination with another electron microscope such as a transmission electron microscope if the resolution of the scanning electron microscope is too low. Specifically, taking the particle diameter when the particles are spherical and the average of the longest axis and shortest axis as the diameter when they are non-spherical, the average primary particle diameter is the average of the diameters of 20 randomly-selected particles observed in scanning electron microscopy or the like.

The specific surface area (BET method) of the hydrophobic oxide fine particles is not particularly limited, but is normally 50 to 300 $m^2/g$ or preferably 100 to 300 $m^2/g$.

The hydrophobic oxide fine particles are not especially limited as long as they have hydrophobic properties, and may be particles that have been made hydrophobic by surface treatment. For example, hydrophilic oxide fine particles can be surface treated with a silane coupling agent to make the surfaces hydrophobic. The type of oxide is also not especially limited as long as it has hydrophobic properties. For example, at least one of silica (silicon dioxide), alumina, and titania or the like can be used. A known commercial product can be adopted in this case. Examples of silica include the products Aerosil R972, Aerosil R972V, Aerosil R972CF, Aerosil R974, Aerosil RX200 and Aerosil RY200 (Japan Aerosil) and Aerosil R202, Aerosil R805, Aerosil R812 and Aerosil R812S (Evonik Degussa). Examples of titania include the product Aeroxide $TiO_2$ T805 (Evonik Degussa) and the like. Examples of alumina include fine particles such as Aeroxide Alu C (Evonik Degussa) and the like that have been made hydrophobic by surface treatment with a silane coupling agent.

Of these, hydrophobic silica fine particles can be used by preference. From the standpoint of obtaining superior non-adhesive properties, hydrophobic silica fine particles having trimethylsilyl groups on the surface of the particle are especially desirable. Examples of corresponding commercial products include the aforementioned Aerosil R812 and Aerosil R812S (both from Evonik Degussa) and the like.

The amount (dried weight) of hydrophobic oxide fine particles attaching to the thermal adhesive layer is not particularly limited, but is preferably 0.01 to 10 $g/m^2$ or more preferably 0.2 to 1.5 $g/m^2$ or still more preferably 0.3 to 1 $g/m^2$. Within this range it is not only possible to maintain superior and lasting non-adhesive properties, but also to control costs and prevent detachment of the hydrophobic oxide fine particles. The hydrophobic oxide fine particles attaching to the thermal adhesive layer preferably form a porous layer having a three-dimensional network structure and a thickness of preferably about 0.1 to 5 μm or more preferably about 0.2 to 2.5 μm. When the particles attach in such a porous layered state, more air can be included in the layer, resulting in superior non-adhesive properties.

The hydrophobic oxide fine particles may attach to the entire surface of the thermal adhesive layer (entire surface opposite the base layer), or may attach to a region other than the region of thermal adhesion of the thermal adhesive layer (margin to adhere). In the fourth invention, even when the particles attach to the entire surface of the thermal adhesive layer, most or all of the hydrophobic oxide fine particles in the region of thermal adhesion do not interfere with thermal adhesion because they become embedded in the thermoplastic resin layer, so adherence to the entire surface of the thermal adhesive layer is desirable from the standpoint of industrial productivity.

In the packaging material of the fourth invention, an oxygen absorbent is contained in at least one of the base layer and the thermal adhesive layer.

A known or commercial available inorganic oxygen absorbent or organic oxygen absorbent can be used for the oxygen absorbent itself. Specific examples include inorganic oxygen absorbents having a fine powder of at least one of iron, silicon, aluminum and the like as the principal agent, and organic oxygen absorbents having at least one of ascorbic acid, an unsaturated fatty acid and the like as the principal agent. A principal agent that irreversibly adsorbs oxygen is preferred.

Metal particles coated on at least part of the surface with a resin component or oxide can be used as the principal agent of the inorganic oxygen absorbent. For example, because aluminum normally has a fast reaction rate with oxygen, the reaction rate can be adjusted by coating part or all of the particle surfaces of aluminum with a resin component when using aluminum-based particles as the metal particles. A commercial product can be used for such aluminum-based particles coated with a resin component (resin-coated Al-based particles), or they can be prepared by known methods. A known method can also be employed for coating particles with an oxide (inorganic oxide). More specifically, in addition to the so-called sol-gel method, it is possible to use the method described in Japanese Patent No. 3948934 for example. In this method, oxide-coated aluminum particles are obtained by adjusting the pH of a dispersed solution containing aluminum particles, an organic silicon compound and a hydrolysis catalyst to thereby hydrolyze the organic silicon compound and precipitate a silica coat on the surface of the aluminum particles.

The content of the oxygen absorbent can be set appropriately according to the desired oxygen absorbency and the like, but normally the content of the principal agent in the base layer or thermal adhesive layer is preferably 0.3 to 30 wt % or more preferably 1 to 20 wt %. Superior oxygen absorbency can be obtained while maintaining the desired thermal adhesiveness and the like if the content is set within this range.

The oxygen absorbent can be included in at least one of the base layer and the thermal adhesive layer, but from the standpoint of obtaining more effective oxygen absorbency it is preferably contained in at least the thermal adhesive layer. The method of including the oxygen absorbent in these layers is not limited as long as it is one whereby the oxygen absorbent can be uniformly dispersed. One possible method is to mix the oxygen absorbent in advance with the raw materials for forming the base layer or thermal adhesive layer. A known mixer, agitator or the like can be used for mixing. Either a dry mixing method or wet mixing method is acceptable in this case.

As a typical example of an oxygen absorbent, an inorganic oxygen absorbent using aluminum-based particles (or resin-coated Al particles) as the principal agent is explained below with preferred embodiments.

The aluminum-based particles are not particularly limited as long as they can provide the desired oxygen absorbency, and in addition to pure aluminum particles, various aluminum alloy particles and the like can be used.

The average particle diameter of the aluminum-based particles is preferably about 1 to 100 μm. An average particle diameter of less than 1 μm is undesirable for reasons of handling and the like. Above 100 μm, on the other hand, the specific surface area is reduced, which is undesirable from the standpoint of oxygen absorbency. The shape of the aluminum-based particles is also not limited, and may be spherical, spheroid, indeterminate form, teardrop, flake or the like.

The resin component (polymer) coated on the surface of the aluminum-based particles is preferably a copolymer obtained by reacting at least two kinds of monomers and oligomers having at least one polymerizable double bond. The proportions of monomers or oligomers used can be set at will.

The oligomers or monomers making up the aforementioned polymer are not particularly limited as long as they have at least one polymerizable double bond.

Examples of monomers having at least one polymerizable double bond include unsaturated carboxylic acids (such as acrylic acid, methacrylic acid, crotonic acid, itaconic acid, citraconic acid, maleic acid or maleic anhydride) or their nitriles (such as acrylonitrile or methacrylonitrile) or esters (such as methyl acrylate, ethyl acrylate, propyl acrylate, n-butyl acrylate, 2-ethylhexyl acrylate, lauryl acrylate, stearyl acrylate, hydroxyethyl acrylate, 2-hydroxypropyl acrylate, methoxyethyl acrylate, butoxyethyl acrylate, glycidyl acrylate, cyclohexyl acrylate, 1,6-hexanediol diacrylate, 1,4-butanediol diacrylate, trimethylol propane triacrylate, tetramethylol methane tetracrylate, tetramethylol methane triacrylate, methyl methacrylate, ethyl methacrylate, propyl methacrylate, n-butyl methacrylate, 2-ethylhexyl methacrylate, lauryl methacrylate, stearyl methacrylate, hydroxyethyl methacrylate, 2-hydroxypropyl methacrylate, methoxyethyl methacrylate, butoxyethyl methacrylate, glycidyl methacrylate, cyclohexyl methacrylate, trimethylol propane trimethacrylate or tetramethylol methane trimethacrylate) and the like. Other examples include cyclic unsaturated compounds (such as cyclohexane), acyclic unsaturated compounds (such as styrene, α-methylstyrene, vinyl toluene, divinyl benzene, cyclohexane vinyl monoxide, divinylbenzene monoxide, vinyl acetate, vinyl propionate or diallyl benzene) and the like.

It is especially desirable to use a monomer having at least two polymerizable double bonds because stability is further improved (resulting in a more stable coat) by the effect of crosslinking when using divinyl benzene, allyl benzene, diallyl benzene or a mixture of these for example as a monomer having at least two polymerizable double bonds.

Examples of oligomers having at least one polymerizable double bond include epoxylated 1,2-polybutadiene, acrylic modified polyester, acrylic modified polyether, acrylic modified urethane, acrylic modified epoxy and acrylic modified spirane (each with a degree of polymerization of about 2 to 20). Of these, at least one of epoxylated 1,2-polybutadiene and acrylic modified polyester is preferred. The degree of polymerization is preferably about 3 to 10. Using an oligomer is preferable to using a monomer by itself because the polymerization reaction proceeds gradually, greatly increasing the reaction efficiency.

The method of coating the aluminum-based particles is not particularly limited. Examples include 1) a method of first soaking or dipping the aluminum-based particles in a solution or dispersion of the resin component dissolved or dispersed in a solvent, and then drying to coat the particle surfaces with the resin component, and 2) a method of first preparing a mixture containing the aluminum-based particles and a solution or dispersion containing a monomer or oligomer capable of constituting the desired resin component, and then polymerizing the monomer or oligomer to thereby coat the particles surfaces with a polymer (resin component).

In the fourth invention, method 2) above can be adopted by preference. For example, in this method the aluminum-based particles can be dispersed in an organic solvent to prepare a dispersion, and at least two oligomers or monomers having at least one polymerizable double bond can then be dissolved in this dispersion and heated in the presence of a polymerization initiator to coat the particle surfaces with a co-polymer.

The aforementioned organic solvent can be an aliphatic hydrocarbon such as hexane, heptane, octane, cyclohexane or mineral spirits, an aromatic hydrocarbon such as benzene, toluene or xylene, a halogenated hydrocarbon such as chlorbenzene, trichlorbenzene, perchlorethylene or trichlorbenzene, an alcohol such as methanol, ethanol, n-propanol or n-butanol, a ketone such as 2-propanone or 2-butanone, an ester such as ethyl acetate or propyl acetate, or tetrahydrofuran, diethyl ether, ethyl propyl ether or the like.

The polymerization initiator may be a known high-temperature or medium-temperature polymerization initiator, such as di-t-butylperoxide, acetyl peroxide, benzoyl peroxide, lauroyl peroxide, cumyl hydroperoxide, t-butyl hydroperoxide or another organic peroxide or $\alpha,\alpha'$-azobisisobutyronitrile or another azo compound.

The temperature of the polymerization reaction (heating temperature) is not particularly limited, and can be set appropriately within the range of normally 60 to 200° C.

In the fourth invention, the polymerization reaction may also be performed in a nitrogen, helium, argon or other inactive gas atmosphere as necessary in order to increase the polymerization efficiency and the like.

The resin-coated Al particles thus produced can be collected by a known solid-liquid separation method, purification method or the like as necessary.

When aluminum-based particles are used as the principal agent in the fourth invention, particles of an aluminum compound are preferably used as an accessory agent. The aluminum compound may be at least one of alumina (aluminum oxide), an aluminum hydroxide, an aluminate, an aluminosilicate salt and the like for example. Of these, alumina is especially desirable. More effective oxygen absorption is achieved by using alumina particles due the catalytic effect of the particles.

The ratio of the aluminum-based particles to the accessory agent is not particularly limited, but is preferably between 3:7 and 7:3 by mass.

An electrolyte that effectively promotes the oxygen absorbing effect of the aluminum particles may also be added as necessary. For example, at a suitable amount of at least one of calcium oxide, calcium hydroxide, magnesium oxide, magnesium hydroxide, sodium chloride, potassium chloride, calcium chloride, sodium carbonate, calcium carbonate or the like can be added as necessary as an electrolyte.

Hydrogen may be produced as a side reaction during oxygen absorption by the aluminum-based particles, and in this case a hydrogen production inhibitor such as silver oxide, titanium, zeolite, active carbon or a sulfide can be added as necessary in the range of 1 ppm to 10 mass %.

5 to 85 mass % of water can also be included as necessary in the oxygen absorber in order to facilitate the oxygen absorption reaction by the aluminum-based particles.

2. Packaging Material Manufacturing Method

The packaging material of the fourth invention can preferably be obtained for example by a method of manufacturing a packaging material consisting of a multilayer body having at least a base layer and a thermal adhesive layer, comprising a step (hereunder sometimes called the "adherence step") of causing hydrophobic oxide fine particles having an average primary particle diameter of 3 to 100 nm to attach to the surface of the thermal adhesive layer.

The method of manufacturing the multilayer body can be carried out by a known method. For example, the thermal adhesive layer can be formed by the methods explained in 1. above on a monolayer base or on a laminate material prepared by dry lamination, extrusion lamination, wet lamination, heat lamination or the like.

The oxygen absorbent may be as explained in 1. above. As discussed above, these can be included in advance in the raw materials for forming the base layer and/or the thermal adhesive layer.

The method used in the hydrophobic oxide fine particle adherence step is not particularly limited. For example, a known method such as roll coating, gravure coating, bar coating, doctor blade coating, brush painting or electrostatic powder coating can be used. When roll coating or the like is used, a coat can be formed on the thermal adhesive layer using a dispersion of the hydrophobic oxide fine particles dispersed in a solvent, and dried to accomplish the adherence step. The solvent in this case is not limited and may be water or an organic solvent such as alcohol (ethanol), cyclohexane, toluene, acetone, IPA, propylene glycol, hexylene glycol, butyl diglycol, pentamethylene glycol, normal pentane, normal hexane, hexyl alcohol or the like. A small amount of a dispersant, colorant, antisettling agent, viscosity adjuster or the like can also be included. The dispersed amount of the hydrophobic oxide fine particles in the solvent can normally be about 10 to 100 g/L. When drying is used, it may be natural drying or forced drying (heat drying), but forced drying is preferred for industrial purposes. The drying temperature is not limited as long as it does not affect the thermal adhesive layer, but is normally 150° C. or less or preferably 80 to 120° C.

In the manufacturing method of the fourth invention, the multilayer body can also be heated during and/or after the aforementioned adherence step. The strength of adherence (fixing strength) of the hydrophobic oxide fine particles on the thermal adhesive layer can be increased by heating the multilayer body. In this case, the heating temperature T can be set appropriately according to the type of thermal adhesive layer or the like, but normally is preferably within the range of $Tm-50 \leq T \leq Tm+50$ given Tm as the melting point (melting initiation temperature) ° C. of the thermal adhesive layer used. The packaging material of this invention may also be embossed, half-cut, notched or the like as necessary in the same way as known packaging materials.

EXAMPLES

The first through fourth inventions are explained in more detail below using examples and comparative examples. However, the scope of the present invention is not limited by these examples.

Examples of First Invention

Examples 1-1 to 1-9 and Comparative Example 1-1

Samples were prepared by causing hydrophobic oxide fine particles to attach to multilayer bodies having thermoplastic resin layers. Specifically, the various samples were prepared as follows.

(1) Preparation of Multilayer Bodies

Example 1-1, Comparative Example 1-1

One side of paper having a basis weight of 55 g/m$^2$ was printed and OP (overprint) coated, while the other side was bonded with a polyurethane dry laminate adhesive (abbreviated as "D"; dried weight 3.5 g/m$^2$) to the surface of a 16 µm-thick aluminum-deposited polyethylene terephthalate film (abbreviated as Al-deposited PET). A heat seal lacquer ("lacquer"; principal components 160 parts by weight polyester resin+10 parts by weight acrylic resin+40 parts by weight solvent (mixed toluene+MEK solvent)) was coated as a thermoplastic resin layer on the polyethylene terephthalate film of this bonded material to a dried weight of about 3 g/m$^2$ (drying conditions 150° C.×10 seconds). A multilayer body composed of "OP/printing/paper/D/Al-deposited PET/lacquer" was obtained in this way.

Examples 1-2 to 1-6

Multilayer bodies were prepared as in Example 1-1 except that 1 to 20 parts by weight (see table) of acrylic resin beads (average particle diameter 30 µm, Sekisui Plastics Co., Ltd.) were further added and mixed with the heat seal lacquer, which was then coated to a dried weight of 3 g/m$^2$ (drying conditions 150° C.×10 seconds).

Examples 1-7 to 1-8

Multilayer bodies were prepared as in Example 1-1 except that 10 parts by weight of acrylic resin beads (average particle diameter 15 µm, Sekisui Plastics Co., Ltd.) were further added and mixed with the heat seal lacquer, which was coated to a dried weight of 3 g/m$^2$ (drying conditions 150° C.×10 seconds).

Example 1-9

Multilayer bodies were prepared as in Example 1-1 except that 10 parts by weight of acrylic resin beads (average particle diameter 8 µm, Sekisui Plastics Co., Ltd.) were further added and mixed with the heat seal lacquer, which was coated to a dried weight of 3 g/m$^2$ (drying conditions 150° C.×10 seconds).

(2) Adherence of Hydrophobic Oxide Fine Particles

Examples 1-1 to 2-9

5 g of hydrophobic oxide fine particles (product name Aerosil R812S (Evonik Degussa), BET specific surface area 220 m$^2$/g, average primary particle diameter 7 nm) were dispersed in 100 mL of ethanol to prepare a coating liquid. This coating liquid was applied by bar coating so as to form a layer having a dried weight of 0.11 to 0.4 g/m$^2$ (see table) on the surface of the thermoplastic resin layer of the multilayer body prepared in (1) above, and dried at 100° C. for about 10 seconds to evaporate the ethanol and obtain a sample (packaging material).

Comparative Example 1-1

The multilayer body of Example 1-1 without attaching hydrophobic oxide fine particles was used as a test sample.

(3) Observation of Porous Layer of Hydrophobic Oxide Fine Particles

Figure 3:
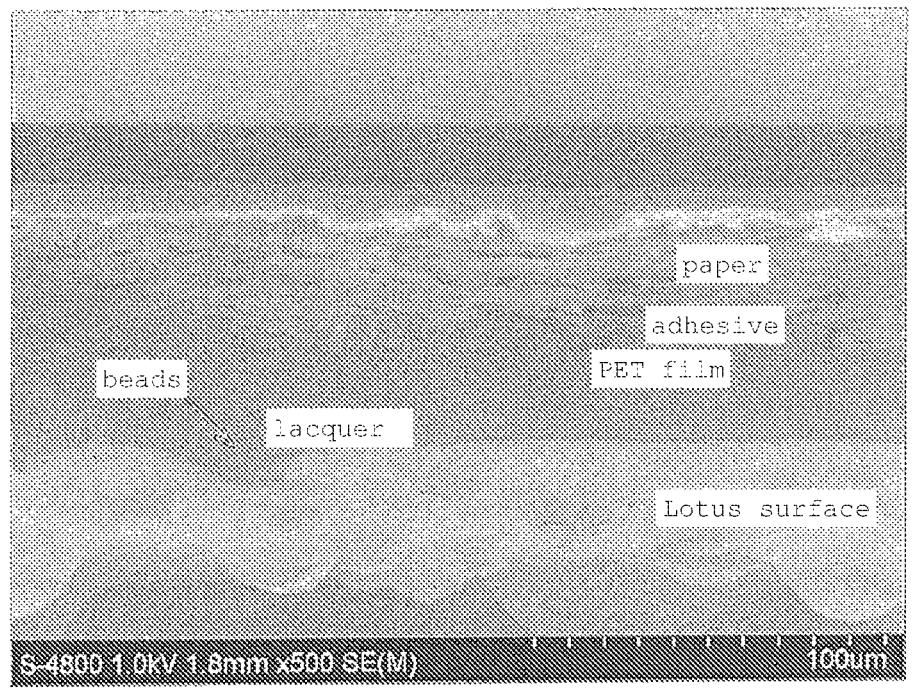
FIG. 3 is a cross-sectional photograph showing part of the packaging material of Example 1-4.

The structures of the layers of hydrophobic oxide fine particles in the packaging materials of the examples were observed by FE-SEM. As a result, porous layers with three-dimensional network structures formed of hydrophobic oxide fine particles were observed in all of the packaging materials. As an example, FIG. 3 shows a partial cross-sectional photograph of the packaging material of Example 1-4. Similar structures were also observed for the other examples.

Test Example 1-1

Opening Strength

The opening strength of the samples obtained in the examples and comparative example was investigated.

Package bodies were prepared using lids cut out in lid shape (62 mm×67 mm rectangle with tab) from each of the packaging materials. Specifically, the package bodies were preparing by heat-sealing these lids on the flanges of flanged polystyrene containers (formed with flange width 4 mm, flange outer diameter 60 mm×65 mm□, height about 48 mm, internal volume about 100 cm$^3$). The seal was a (concave) ring seal about 2 mm wide, formed under conditions of temperature 210° C., pressure 2 kg/cm$^2$ for 1 second. The tab on the lid on each package body was pulled at a rate of 100 mm/minute at an elevation angle of 45° relative to the opening start point, the maximum load at the time of opening was given as the opening strength (N), and the average (n=6) was calculated for each package body. The results are shown in Tables 1 and 2.

Test Example 1-2

Seal Performance (Sealing Strength)

Using the package body prepared in Test Example 1-1 as the test sample, a sealing strength test was performed in accordance with the sealing strength test methods of the Ministerial Ordinance Concerning Compositional Standards, etc. for Milk and Milk Products (Ordinance 17 of the Ministry of Health and Welfare, Apr. 16, 1979 Japan). Air was supplied continuously inside the containers, and the internal pressure (mmHg) at the time of air leakage was measured. The number of measurements for each package body was n=3, but all were above the upper measurement limit of 300 mmHg. The results are shown in Tables 1 and 2.

Test Example 1-3

Initial Yogurt Non-Adherence

Using the thermoplastic resin layer side of each multilayer body as the test surface, the sample was fixed with a clip on a horizontal platform with this surface face up, commercial yogurt ("Oishii Kasupikai" soft yogurt, Glico Dairy Products Co., Ltd., 1 drop=about 0.4 g) was dripped from a short distance, the horizontal platform was tilted, and the sample was judged "passed" if the yogurt drop rolled off and "failed" if it smeared rather than rolling even when the platform was tipped 90°. The results are shown in Tables 1 and 2.

Test Example 1-4

Inversion Test

The flanged polystyrene containers used in Test Example 1-1 were each filled with 85 g of commercial yogurt (soft yogurt, product name "Oishii Kasupikai", Glico Dairy Products Co., Ltd.), and heat sealed with lids as in Test Example 1-1. Each container body was held upside-down for 10 seconds (with the opening facing downwards) and then turned right-side up (with the opening facing up), the lid was opened manually, and the condition of the surface of each lid on the thermoplastic resin layer side was observed with the naked eye. The sample was judged "passed" if no yogurt adhered, and "failed" if yogurt adhered to the lid. The results are shown in Tables 1 and 2.

Test Example 1-5

Vibration Test

Package bodies were prepared as in Test Example 1-4, these package bodies were vibrated under conditions of amplitude 2.2 mm (up and down), acceleration about 1 G for 20 minutes at 30 Hz (30 up and down vibrations per minute) with a vibration tester (Idex Co., Ltd. BF-30U), the lids were opened manually, and the weight of yogurt adhering to each lid was measured. The sample was judged "passed" if the amount was less than 0.5 g/cup, and "failed" if it was 0.5 g/cup or more. The results are shown in Tables 1 and 2.

Test Example 1-6

Abrasion Resistance

Using the surface on the thermoplastic resin layer side of each multilayer body as the test surface, an abrasion resistance test was performed under conditions of 100 reciprocations, load 200 g, facing material: chrome plate surface, using a Gakushin-type rubbing tester (JIS K 5701-1). Following the abrasion resistance test the same yogurt non-adherence test was performed as in Test Example 3, and the sample was judged "passed" if the yogurt drop rolled off and "failed" if it smeared rather than rolling even when the platform was tipped 90°. The results are shown in Tables 1 and 2.

Test Example 1-7

Contact Angle

Using the surface on the thermoplastic resin layer side of each multilayer body as the test surface, the pure water contact angle was measured using a contact angle measuring device (solid-liquid interface analyzer "Drop Master 300", Kyowa Interface Science Co., Ltd.). The results are shown in Tables 1 and 2.

TABLE 1

|  | Acrylic beads (parts by weight) | Amount of hydrophobic oxide fine particles (g/m$^2$) | Test Ex 1-3 Initial yogurt repellency | Test Ex 1-4 Yogurt filled, sealed, inverted 10 secs, opened | Test Ex 1-5 Yogurt filled, sealed, vibration test 1 G × 20 min | Test Ex 1-6 Gakushin-type rubbing test: reciprocating motion 100×, chrome plate surface (200 g) | Test Ex 1-7 Water repellency test: contact angle (°) | Test Ex 1-1 Opening strength (N/cup) | Test Ex 1-2 Sealing strength (mmHg) |
|---|---|---|---|---|---|---|---|---|---|
| Ex 1-1 | 0 | 0.3 | Passed | Passed | Passed | Failed | >150 | 6 | 300 up |
| Ex 1-2 | 1 | 0.3 | Passed | Passed | Passed | Passed | >150 | 6 | 300 up |
| Ex 1-3 | 3 | 0.3 | Passed | Passed | Passed | Passed | >150 | 5.5 | 300 up |
| Ex 1-4 | 5 | 0.4 | Passed | Passed | Passed | Passed | >150 | 5.5 | 300 up |
| Ex 1-5 | 10 | 0.4 | Passed | Passed | Passed | Passed | >150 | 5.5 | 300 up |
| Ex 1-6 | 20 | 0.4 | Passed | Passed | Passed | Passed | >150 | 5 | 300 up |
| CE 1-1 | 0 | 0 | Failed | Failed | Failed | Failed | 85 | 6 | 300 up |

TABLE 2

|  | Acrylic beads (parts by weight) Beads average diameter is shown in parenthesis | Amount of hydrophobic oxide fine particles (g/m$^2$) | Test Ex 1-3 Initial yogurt repellency | Test Ex 1-4 Yogurt filled, sealed, inverted 10 secs, opened | Test Ex 1-5 Yogurt filled, sealed, vibration test 1 G × 20 min | Test Ex 1-6 Gakushin-type rubbing test: reciprocating motion 100×, chrome plate surface (200 g) | Test Ex 1-7 Water repellency test: contact angle (°) | Test Ex 1-1 Opening strength (N/cup) | Test Ex 1-2 Sealing strength (mmHg) |
|---|---|---|---|---|---|---|---|---|---|
| Ex 1-7 | 10 (15 μm) | 0.3 | Passed | Passed | Passed | Passed | >150 | 6 | 300 up |
| Ex 1-8 | 10 (15 μm) | 0.11 | Passed | Passed | Passed | Passed | >150 | 7 | 300 up |
| Ex 1-9 | 10 (8 μm) | 0.25 | Passed | Passed | Passed | Passed | >150 | 5.5 | 300 up |

As shown by the results of Tables 1 and 2, no non-adhesive properties (yogurt repellency) were obtained with the conventional product (comparative example), which exhibited a pure water contact angle of 85°, while good non-adhesive properties were obtained with the first invention (example). In terms of opening strength and sealing properties (sealing strength), the performance was also adequate for practical applications. The contact angle results also show that the multilayer body and packaging material of the first invention have good water repellency.

In particular, the outside surface (surface with attaching hydrophobic oxide fine particles) on the thermoplastic resin layer side of the multilayer body and packaging material of the first invention exhibited a pure water contact angle of 150° or more, a degree of non-adherence of the contents not seen with conventional packaging materials. When inorganic or organic particles were included as particulate filler in the thermoplastic resin layer, moreover, abrasion resistance was dramatically improved, and detachment of the hydrophobic oxide fine particles was effectively reduced or prevented, resulting in more durable non-adhesive properties.

Examples of Second Invention

Example 2-1

50 g of hydrophobic oxide fine particles (product name Aerosil R812S (Evonik Degussa), BET specific surface area 220 m$^2$/g, average primary particle diameter 7 nm) were dispersed in 1000 mL of ethanol to prepare a coating liquid. A commercial polypropylene container (flange width about 3 mm, outer flange diameter about 70 mm, height about 110 mm, internal volume about 200 cc) was dipped in this coating liquid. The adhering amount of the coating liquid was 0.5 g/m$^2$ dried weight (adhering solids). After the dipping treatment, the ethanol was evaporated with warm air at 25° C. for 30 seconds (drying treatment) to obtain a sample (container).

Example 2-2

50 g of hydrophobic oxide fine particles (product name Aerosil R812S (Evonik Degussa), BET specific surface area 220 m$^2$/g, average primary particle diameter 7 nm) were dispersed in 1000 mL of ethanol to prepare a coating liquid. A commercial flanged paper/polyethylene container (flange width 3 mm, outer flange diameter 70 mm, height about 55 mm, internal volume about 130 cm$^3$, made of about 300 μm-thick paper coated with 100 μm of polyethylene and formed with the polyethylene on the inside) was dipped in this coating liquid. The adhering amount of the coating liquid was 0.5 g/m$^2$ dried weight (adhering solids). After the dipping treatment, the ethanol was evaporated with warm air at 25° C. to obtain a sample (container).

Example 2-3

50 g of hydrophobic oxide fine particles (product name Aerosil R812S (Evonik Degussa), BET specific surface area 220 m$^2$/g, average primary particle diameter 7 nm) were dispersed in 1000 mL of ethanol to prepare a coating liquid. A commercial flanged polystyrene container (flange width about 3 mm, outer flange diameter about 88 mm, height about 63 mm, internal volume about 176 cc) was dipped in this coating liquid. The adhering amount of the coating liquid was 0.5 g/m$^2$ dried weight (adhering solids). After the dipping treatment, the ethanol was evaporated with warm air at 25° C. to obtain a sample (container).

Comparative Example 2-1

The commercial polypropylene container used in Example 2-1 was used as is as a sample.

Comparative Example 2-2

The commercial paper/polyethylene container used in Example 2-2 was used as is as a sample.

Comparative Example 2-3

The commercial polystyrene container used in Example 2-3 was used as is a sample.

Test Example 2-1

Observation of Porous Layer of Hydrophobic Oxide Fine Particles

In the containers of Examples 2-1 to 2-3, the structures of the layers of hydrophobic oxide fine particles were observed by FE-SEM. As a result, porous layers were observed having three-dimensional network structures formed of hydrophobic oxide fine particles.

Contact Angle

Using the inner bottom surfaces of the containers of Examples 2-1 to 2-3 as test pieces (test surfaces), the pure water contact angles were measured with a contact angle measuring device (solid-liquid interface analyzer "Drop Master 300", Kyowa Interface Science Co., Ltd.), and all were 150° or more.

Adherence Test

The containers of Examples 2-1 to 2-3 and Comparative Examples 2-1 to 2-3 were weighed (weight A) in advance, after which each was filled with 100 g of commercial yogurt (soft yogurt, product name "Oishii Kasupikai", Glico Dairy Products Co., Ltd.), the contents were expelled by inverting the containers for 10 seconds (with the openings on the bottom), and the containers were turned right-side up (with the opening on top) and weighed again (weight B). The amount of adhering yogurt was calculated as B−A. The measurement results (n=10) are shown in Table 3.

TABLE 3

| | Container material | Adhering amount (g) n = 10 | | | | | | | | | | Average | σ |
|---|---|---|---|---|---|---|---|---|---|---|---|---|---|
| Ex 2-1 | Polypropylene | 0.7 | 0.5 | 0.4 | 0.5 | 0.3 | 0.2 | 0.1 | 0.3 | 0.3 | 0.2 | 0.4 | 0.18 |
| Ex 2-2 | Paper/polyethylene | 1.5 | 1.4 | 1.2 | 1.2 | 1.0 | 1.5 | 1.4 | 1.3 | 0.9 | 1.1 | 1.3 | 0.21 |
| Ex 2-3 | Polystyrene | 0.7 | 0.3 | 0.3 | 0.2 | 0.4 | 0.2 | 0.5 | 0.3 | 0.1 | 0.2 | 0.3 | 0.18 |
| CE 2-1 | Polypropylene | 5.7 | 6.6 | 6.8 | 7.5 | 7.0 | 5.8 | 6.1 | 5.7 | 6.3 | 5.9 | 6.3 | 0.62 |
| CE 2-2 | Paper/polyethylene | 14.5 | 15.0 | 11.5 | 10.0 | 14.0 | 12.3 | 13.1 | 11.9 | 12.5 | 13.0 | 12.8 | 1.49 |
| CE 2-3 | Polystyrene | 19.1 | 17.5 | 14.9 | 13.8 | 16.5 | 15.9 | 17.3 | 16.4 | 15.9 | 17.0 | 16.4 | 1.46 |

As shown by the results of Table 3, about 6 to 16% of the filled amount remained sticking to the container in the case of the conventional products (comparative examples), while in the examples this amount was reduced to about 1% or less of the filled amount (almost no sticking). The containers of the second invention exhibited a pure water contact angle of 150° or more, a degree of non-adherence of the contents not seen with conventional containers.

Example 2-4

A sample (container) was obtained as in Example 2-1 except that the drying treatment following dipping was hot air drying for 30 seconds at 140° C.

Example 2-5

A sample (container) was obtained as in Example 2-1 except that the drying treatment following dipping was hot air drying for 30 seconds at 160° C.

Test Example 2-2

Continuity Improvement Test

The containers of Examples 2-1, 2-4 and 2-5 were weighed in advance (weight A), after which each was filled with 100 g of commercial yogurt (soft yogurt, product name "Oishii Kasupikai", Glico Dairy Products Co., Ltd.), 0.5 g/m$^2$ (as dried weight) of the coating liquid used in Example 1 was coated on the thermal adhesive layer surface of a laminated lid consisting of a 40 μm-thick aluminum foil with a thermal adhesive layer, and this lid was thermally bonded to the end surfaces of the openings (flanges, etc.) of the aforementioned containers to make package bodies. These package bodies were each vibrated with a vibration tester (Idex Co., Ltd. BF-30U) for 1 minute under conditions of 30 Hz (30 up-and-down vibrations per minute), 2.2 mm (vertical) amplitude, acceleration about 40 G, the lids were unsealed and removed (with no yogurt adhering to the lids), each container was inverted for 10 seconds (with the openings facing down) to remove the contents, and the containers were turned right-side up (with the openings facing up) and the containers weighed (weight B). The adhering amount of yogurt was calculated as B−A. The results (n=10) are shown in Table 4.

(1) Preparation of Multilayer Bodies
<Hot Melt Type>

A base layer was prepared by using a polyurethane-based dry laminate adhesive (abbreviated as "D"; dried weight 3.5 g/m$^2$) to bond the printed surface of a reverse-printed (abbreviated as "print") 12 μm-thick polyethylene terephthalate (PET) film to one side of a 15 μm-thick aluminum foil (abbreviated as "AL"; 1N30, soft foil). The aluminum surface of this base layer was treated with an anchor coat (abbreviated as "AC"; principal component polyester resin), and low density polyethylene resin (abbreviated as LDPE) was extrusion laminated so as to form a film having a dried film thickness of 20 μm. A hot melt agent (abbreviated as "HM"; wax 35 parts by weight, rosin 35 parts by weight and ethylene-vinyl acetate copolymer 30 parts by weight) was gravure hot-melt coated to a dried weight of 20 g/m$^2$ on the low-density polyethylene. A multilayer body composed of PET/print/D/AL/AC/LDPE/HM was obtained in this way.

<Sealant Type>

A base layer was prepared by using a polyurethane dry laminate adhesive (abbreviated as "D"; dried weight 3.5 g/m$^2$) to bond the printed surface of a reverse-printed (abbreviated as "print") 12 μm-thick polyethylene terephthalate (abbreviated as PET) film to one side of a 15 μm-thick aluminum foil ("AL"; 1N30, soft foil). The aluminum surface of this base layer was treated with an anchor coat ("AC"; principal component polyester resin), and low-density polyethylene resin (abbreviated as LDPE, dried film thickness 20 μm) was used to extrusion laminate a 30 μm thick sealant film (principal component metallocene-catalyzed polyethylene, abbreviated as "sealant"). A multilayer body composed of PET/print/D/AL/AC/LDPE/sealant was obtained in this way.

Lacquer Type

A base layer was prepared by using a polyurethane dry laminate adhesive ("D"; dried weight 3.5 g/m$^2$) to bond the printed surface of a reverse-printed (abbreviated as "print") 12 μm-thick polyethylene terephthalate (PET) film to one side of a 15 μm-thick aluminum foil ("AL"; 1N30, soft foil). Using a polyurethane dry laminate adhesive ("D"; dried weight 3.5 g/m$^2$), a separately-prepared 12 μm-thick polyethylene terephthalate film (PET) was bonded to the aluminum surface of this base layer, and heat seal lacquer (principal components: acrylic resin and polyester, abbreviated as "lacquer") was coated so as to form a coat having a dried weight

TABLE 4

| | Container material | Adhering amount (g) n = 10 | | | | | | | | | | Average | σ |
|---|---|---|---|---|---|---|---|---|---|---|---|---|---|
| Ex 2-1 | Polypropylene | 11.2 | 12.5 | 10.0 | 9.7 | 11.3 | 11.3 | 10.6 | 12.3 | 11.9 | 11.6 | 11.2 | 0.92 |
| Ex 2-4 | Polypropylene | 2.4 | 2.1 | 1.8 | 3.1 | 2.2 | 2.5 | 1.3 | 3.0 | 1.9 | 3.1 | 2.3 | 0.60 |
| Ex 2-5 | Polypropylene | 2.4 | 2.5 | 2.7 | 1.9 | 2.7 | 1.8 | 2.9 | 1.6 | 3.2 | 2.8 | 2.5 | 0.52 |

As shown by the results of Table 4, the continuity of the non-adhesive properties (durability) can be further improved by heat treatment after adherence of the hydrophobic oxide fine particles.

Examples of Third Invention

Examples 3-1 to 3-9 and Comparative Examples 3-1 to 3-3

Samples were prepared by causing hydrophobic oxide fine particles to attach to multilayer bodies having the various types of thermal adhesive layers shown in Table 5. Specifically, the samples were prepared as follows.

of 5 g/m$^2$. A multilayer body composed of PET/print/D/AL/D/PET/lacquer was obtained in this way.

(2) Adherence of Hydrophobic Oxide Fine Particles 5 g of hydrophobic oxide fine particles (product name Aerosil R812S (Evonik Degussa), BET specific surface area 220 m$^2$/g, average primary particle diameter 7 nm) were dispersed in 100 mL of ethanol to prepare a coating liquid. This coating liquid was applied by gravure coating or bar coating so as to form a coat having a dried weight of 0.3 to 1.0 g/m$^2$ on the surface of the thermal adhesive layers of the multilayer bodies prepared in (1) above, and dried at 100° C. for about 10 seconds to evaporate the ethanol and prepare samples (packaging materials).

Figure 8:
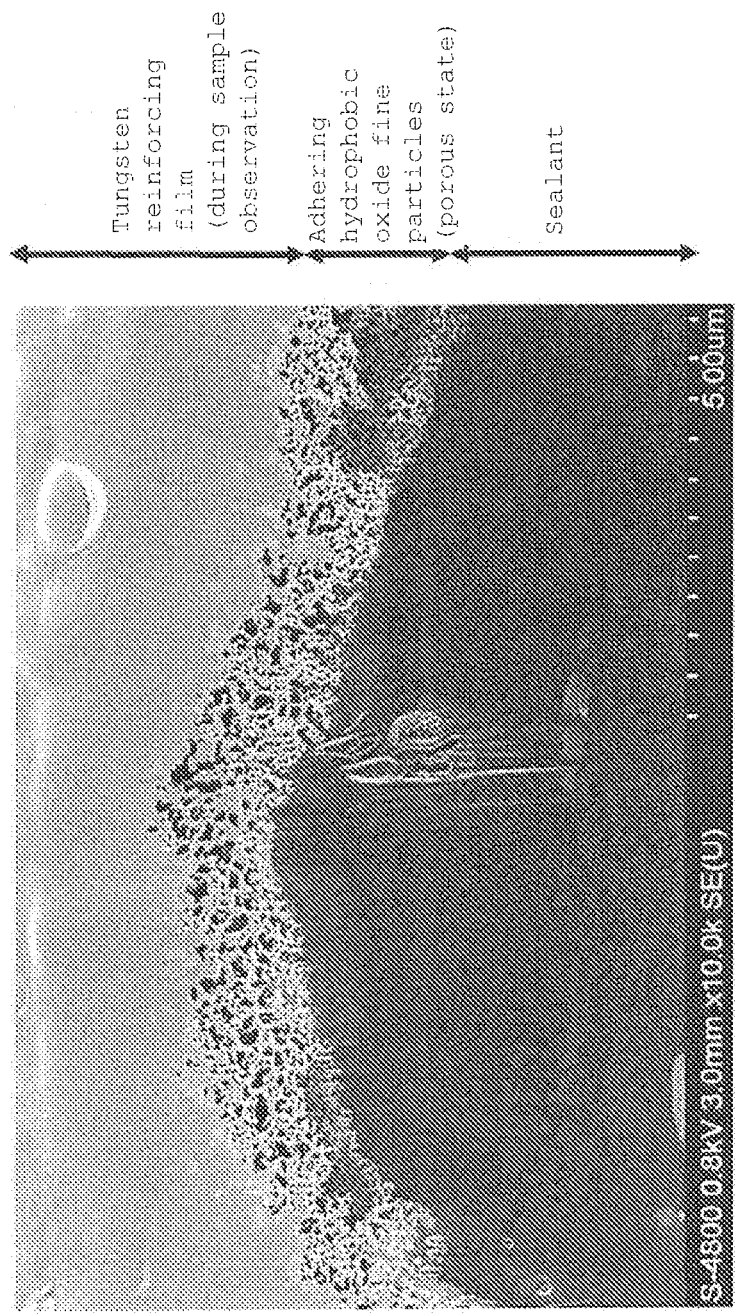
FIG. 8 shows the results of FE (field emission)-SEM of the cross-sectional structure of a packaging material obtained in an example.

(3) Observation (Verification) of Porous Layers of Hydrophobic Oxide Fine Particles The structures of the layers of hydrophobic oxide fine particles in the packaging materials of the examples were observed by FE-SEM. As a result, porous layers having three-dimensional network structures of hydrophobic oxide fine particles were observed in all of the packaging materials. As an example, the observation results for Example 3-4 (A) are shown in FIG. 8. FIG. 8 shows a layer of mixed black and white on the thermal adhesive layer (sealant). The white part is the porous layer of hydrophobic oxide fine particles. This shows that a porous layer of hydrophobic oxide fine particles is formed by coating and drying the aforementioned coating liquid.

Test Example 3-1

Seal Strength

The seal strength of the samples obtained in the examples and comparative examples was investigated.

Examples 3-1 to 3-6 and Comparative Examples 3-1 and 3-2

Package bodies were prepared using lids cut out in lid shape (75 mm diameter with tab) from the various packaging materials. Specifically, each lid was heat sealed on the flange of a flanged paper/polyethylene container (flange width 3 mm, outer flange diameter 70 mm, height about 55 mm, internal volume about 130 cm$^3$, made of about 300 μm-thick paper coated with 100 μm of polyethylene and formed with the polyethylene on the inside) to prepare a package body. The heat-seal conditions were temperature 160° C., pressure 1 kg/cm$^2$, 1 second. The tab of the lid on each package body was pulled at a rate of 100 mm/minute at an elevation angle of 45° relative to the opening start point, the maximum load at the time of opening was given as the seal strength (N), and the average (n=6) was calculated for each package body. The results are shown in Table 5.

Examples 3-7 to 3-9 and Comparative Example 3-3

Package bodies were prepared using lids cut out in lid shape (62 mm×67 mm rectangle with tab) from each of the packaging materials. Specifically, the package bodies were preparing by heat-sealing these lids on the flanges of flanged polystyrene containers (molded with flange width 4 mm, flange outer diameter 60 mm×65 mm height about 48 mm, internal volume about 100 cm$^3$). The seal was a (concave) ring seal about 2 mm wide, formed under conditions of temperature 210° C., pressure 2 kg/cm$^2$, 1 second. The tab of the lid on each package body was pulled at a rate of 100 mm/minute at an elevation angle of 45° relative to the opening start point, the maximum load at the time of opening was given as the seal strength (N), and the average (n=6) was calculated for each package body. The results are shown in Table 5.

Test Example 3-2

Sealing Strength (Puncture Strength)

Using the package body prepared in Test Example 3-1 as the test sample, a sealing strength test was performed in accordance with the sealing strength test methods of the Ministerial Ordinance Concerning Compositional Standards, etc. for Milk and Milk Products (Ordinance 17 of the Ministry of Health and Welfare, Apr. 16, 1979). Air was supplied continuously inside the containers, and the internal pressure (mmHg) at the time of air leakage was measured. The measurements for each package body (n=3) were then averaged. The results are shown in Table 5.

Test Example 3-3

Contact Angle

Using the thermal adhesive layer side of each packaging material as the test surface, the pure water contact angle was measured using a contact angle measuring device (solid-liquid interface analyzer "Drop Master 300", Kyowa Interface Science Co., Ltd.). The results are shown in Table 5.

Test Example 3-4

Angle of Drop

Using the thermal adhesive layer side of each packaging material as the test surface, the sample was fixed with a clip on a horizontal platform with this surface face up, commercial yogurt ("Oishii Kasupikai" soft yogurt, Glico Dairy Products Co., Ltd., 1 drop=about 0.4 g) was dripped from a short distance, the horizontal platform was tilted, and the angle at which the yogurt drop rolled off was determined. The results are shown in Table 5. In Comparative Examples 3-1 to 3-3, the drops smeared rather than rolling even at 90°.

Test Example 3-5

Conveyance Test

The package bodies used in Test Example 3-1 were each filled with 100 g (flanged paper/polyethylene container) or 85 g (flanged polystyrene container) of commercial yogurt ("Oishii Kasupikai" soft yogurt, Glico Dairy Products Co., Ltd.), and heat-sealed with lids as in Test Example 3-1. The package bodies filled with yogurt were transported for 1500 km along a long-distance track, the lids were opened by hand, and the surface of each lid on the thermal adhesive layer side was observed with the naked eye. The results are shown in Table 5. In the results, "⊚" indicates no yogurt adhering, "○" indicates some yogurt adhering in a ring around the edge (adhering area 20% or less), "Δ" indicates obvious adherence (area of adherence more than 20% but less than 90%), and "x" indicates almost complete adherence (area of adherence 90% or more). "⊚" or "○" is considered a good evaluation.

TABLE 5

| Thermal adhesive | Hot melt type (20 g/m$^2$) Paper/polyethylene container | | | | | | | Sealant type (30 μm) Paper/polyethylene container | | | | | | |
|---|---|---|---|---|---|---|---|---|---|---|---|---|---|---|
| Container | | | | | | | | | | | | | | |
| Particle | Adhering amount (g/m$^2$) | | | | | | | Adhering amount (g/m$^2$) | | | | | | |
| adhering | | 0.3 | | 0.5 | | 1.0 | | | 0.3 | | 0.5 | | 1.0 | |
| condition | No | A | B | A | B | A | B | No | A | B | A | B | A | B |
| Seal strength (N/cup) | 13.5 | 9.9 | 9.7 | 7.5 | 7.3 | 6.8 | 6.4 | 8.4 | 7.6 | 8.4 | 7.8 | 7.8 | 6.4 | 6.5 |

TABLE 5-continued

| | CE 3-1 | Example 3-1 | | Example 3-2 | | Example 3-3 | | CE 3-2 | Example 3-4 | | Example 3-5 | | Example 3-6 | |
|---|---|---|---|---|---|---|---|---|---|---|---|---|---|---|
| Sealing (puncture strength) (mmHg) | 300 | 230 | 210 | 180 | 170 | 160 | 150 | 210 | 150 | 160 | 140 | 140 | 130 | 130 |
| Contact angle | 80 | >150 | >150 | >150 | >150 | >150 | >150 | 90 | >150 | >150 | >150 | >150 | >150 | >150 |
| Drop angle | 90 | 40 | 42 | 35 | 33 | 40 | 43 | 90 | 22 | 12 | 20 | 15 | 20 | 20 |
| Shipping test (1500 km) | X | ○ | ○ | ◎ | ◎ | ◎ | ◎ | X | ○ | ◎ | ◎ | ◎ | ◎ | ◎ |

| | Thermal adhesive Container | Lacquer type (5 g/m²) Polystyrene container | | | | | |
|---|---|---|---|---|---|---|---|
| Particle | | Adhering amount (g/m²) | | | | | |
| | | 0.3 | | 0.5 | | 1.0 | |
| adhering condition | No | A | B | A | B | A | B |
| Seal strength (N/cup) | 6.4 | 8.0 | 8.7 | 4.9 | 2.6 | 4.4 | 3.5 |
| Sealing (puncture strength) (mmHg) | 300 | 300 | 300 | 300 | 270 | 280 | 250 |
| Contact angle | 85 | >150 | >150 | >150 | >150 | >150 | >150 |
| Drop angle | 90 | 16 | 16 | 19 | 13 | 18 | 15 |
| Shipping test (1500 km) | X | ◎ | ◎ | ○ | ◎ | ◎ | ◎ |
| Example/Comp. Example | CE 3-3 | Example 3-7 | | Example 3-8 | | Example 3-9 | |

Note:
Coated amounts are all dried weight
A: Gravure coated
B: Bar coated
>150: 150° or more As shown by the results of Table 5, no non-adhesive properties were obtained with the conventional products (comparative examples), while good non-adhesive properties were obtained with the third invention (examples). In terms of seal strength and sealing properties (puncture value), the performance was also adequate for practical applications. The results for contact angle and drop angle also illustrate the good non-adhesive properties of the packaging material of the present invention. In particular, the outside surface (surface with attaching hydrophobic oxide fine particles) on the thermal adhesive layer side of the packaging material of the third invention exhibited a pure water contact angle of 150° or more, a degree of non-adherence of the contents not seen with conventional packaging materials.

Examples of Fourth Invention

Examples 4-1 to 4-3 and Comparative Example 4-1

Samples were prepared and evaluated as follows.

(1) Preparation of Thermal Adhesive (1-1) Thermal Adhesive Containing Iron-Based Oxygen Absorbent A commercial product (Mitsubishi Gas Chemical Co., Inc. "Ageless") was used as is as the iron-based oxygen absorbent, and added and mixed in the amount of 10 wt % in a heat seal lacquer (principal components: polyester resin 160 parts by weight+acrylic resin 10 parts by weight+solvent (toluene+MEK mixed solvent) 40 parts by weight) to prepare the thermal adhesive used for Example 4-1.

(1-2) Thermal Adhesive Containing Aluminum-Based Oxygen Absorbent.

Pure aluminum powder (Toyo Aluminium atomized powder, average particle diameter 8 μm, BET specific surface area 0.7 m²/g) and resin-coated aluminum powder (3 g coated resin per 100 g aluminum) obtained by coating the surface of the same powder with resin were used as the principal agents of the aluminum-based oxygen absorbent. The resin was coated on the surface of the aluminum powder by loading 1.5 g of epoxylated 1,2-polybutadiene, 3.5 g of trimethylol propane triacrylate, 0.3 g of acrylic acid, 1.4 g of divinyl benzene, 1440 g of mineral spirits and 20 g of untreated aluminum powder in a 3-liter 4-mouthed flask, and mixing by thorough agitation with a supply of nitrogen gas. The temperature in the system was raised to 80° C., and 1.1 g of $\alpha,\alpha'$-azobisisobutyronitrile (AIBN) was added and reacted for 6 hours at 80° C. with continuous agitation. After completion of the reaction the mixture was filtered, and dried at 140° C. to obtain resin-coated aluminum powder.

Next, 1 g of the principal agents of the aluminum-based oxygen absorbent, 1 g of α-alumina powder (Taimei Chemicals Co., Ltd. TM-DAR, average particle diameter 0.1 μm, BET specific surface area 14.5 m²/g), 0.5 g of calcium oxide (Wako Pure Chemical Industries, Ltd. purity 99.9%) and 0.5 g of zeolite A-4 (Wako Pure Chemical Industries, Ltd. average particle diameter 3.5 μm) were agitated and mixed, after which 27 g of binder (principal components: polyester resin 160 parts by weight+acrylic resin 10 parts by weight+solvent (toluene+MEK mixed solvent) 40 parts by weight) was added and mixed with agitation, and 1 g of water was added and mixed to obtain the thermal adhesives used for Examples 4-2 and 4-3.

(2) Preparation of Packaging Materials

A base layer was prepared by using a polyurethane dry laminate adhesive (abbreviated as "D"; dried weight 3.5 g/m²) to bond the printed surface of a reverse-printed (called "print") 12 µm-thick polyethylene terephthalate (PET) film to one side of a 15 µm-thick aluminum foil (abbreviated as "AL"; 1N30, soft foil). Using a polyurethane dry laminate adhesive (abbreviated as "D"; dried weight 3.5 g/m²), a separately-prepared 12 µm-thick polyethylene terephthalate film (abbreviated as "PET") was bonded to the aluminum surface of this base layer, and coated with the thermal adhesives prepared in (1-1) and (1-2) above so as to form a coat having a dried weight of 3 g/m².

A packaging material was prepared in the same way for Comparative Example 4-1, but using a thermal adhesive containing no oxygen absorbent (principal components: 160 parts by weight polyester resin+10 parts by weight acrylic resin+40 parts by weight solvent (toluene+MEK mixed solvent)).

(3) Adherence of Hydrophobic Oxide Fine Particles 5 g of hydrophobic oxide fine particles (product name Aerosil R812S (Evonik Degussa), BET specific surface area 220 m²/g, average primary particle diameter 7 nm) were dispersed in 100 mL of ethanol to prepare a coating liquid. This coating liquid was bar coated so as to form a coat having a dried weight of 0.5 g/m² on the surface of the thermal adhesive layers of the packaging materials prepared in (2) above, and dried at 100° C. for about 10 seconds to evaporate the ethanol and prepare samples. The sample of Comparative Example 4-1 has no attaching hydrophobic oxide fine particles.

(4) Observation of Porous Layer of Hydrophobic Oxide Fine Particles

The structures of the layers of hydrophobic oxide fine particles in the packaging materials of the examples were observed by FE-SEM. As a result, porous layers having three-dimensional network structures of hydrophobic oxide fine particles were observed in all of the packaging materials.

(5) Measurement of Residual Oxygen in container

Package bodies were prepared using lids cut out in lid shape (62 mm×67 mm rectangle with tab) from each of the packaging materials. Specifically, the package bodies were prepared by filling flanged polystyrene containers (molded with flange width 4 mm, flange outer diameter 60×65 mm□, height about 48 mm, internal volume about 105 cm³) with 80 g of water and heat-sealing the lids on the flanges of the containers. The seal was a (concave) ring seal about 2 mm wide, formed under conditions of temperature 220° C., pressure 3 kg/cm², 1 second. This was left at room temperature for 72 hours, and the residual oxygen concentration inside the container was measured with an Oxygen Analyzer (Toray LC-750). The results are shown in Table 6.

(6) Residual Air (Gas) in Container

The lids of package bodies prepared as in (5) above were removed in a water tank, the air (gas) escaping from the containers was collected with a messcylinder, and the amount of gas was measured in water. The results are shown in Table 6.

(7) Yogurt Non-Adherence and Scattering

Package bodies were prepared as in (5) above except that the contents were commercial yogurt ("Oishii Kasupikai" soft yogurt, Glico Dairy Products Co., Ltd.), and left for 72 hours in a refrigerator set to 5° C. The containers were first turned upside-down (with the lids on the bottom) and then turned right-side up (with the lids on top) three times, and the lids were unsealed. To evaluate non-adherence, the lids were observed with the naked eye, and judged "failed" it yogurt adhered and "passed" if no yogurt adhered. For the scattering evaluation, the lids were judged "failed" if yogurt drops scattered outside the container when the lid was unsealed, and "passed" if no yogurt scattered. The results are shown in Table 6.

(8) Contact Angle

Using the thermal adhesive layer side of each packaging material as the test surface, the pure water contact angle was measured using a contact angle measuring device (solid-liquid interface analyzer "Drop Master 300", Kyowa Interface Science Co., Ltd.). The results are shown in Table 6.

TABLE 6

| | Oxygen absorbent | Principal agent | Residual oxygen concentration (%) | Residual air in container (cc) | Non-adhesive properties | Scattering | Contact angle (°) |
|---|---|---|---|---|---|---|---|
| Example 4-1 | Iron-based oxygen absorbent | / | 19.6 | 22.2 | Passed | Passed | >150 |
| Example 4-2 | Aluminum-based oxygen absorbent | Aluminum powder | 20.0 | 22.2 | Passed | Passed | >150 |
| Example 4-3 | Aluminum-based oxygen absorbent | Resin-coated aluminum powder | 19.9 | 22.5 | Passed | Passed | >150 |
| Comparative Example 4-1 | None | None | 20.9 | 23.2 | Failed | Failed | 85 |

As shown by the results of Table 6, no non-adhesive properties were obtained with the conventional product (comparative example), but good non-adhesive properties were obtained with the fourth invention (examples). The results for contact angle also indicate that the packaging material of the present invention has good non-adhesive properties.

In particular, the outside surface (surface with attaching hydrophobic oxide fine particles) on the thermal adhesive layer side of the packaging material of the fourth invention has a pure water contact angle of 150° or more, a degree of non-adherence of the contents not seen in conventional packaging materials. Since the lid of the present invention contains an oxygen absorbent in at least one of the base layer and the thermal adhesive layer, moreover, it is effective for preventing decay and chemical change during long-term storage, and in preventing scattering and leakage of the contents by reducing the pressure inside the package body.

The invention claimed is:

1. A packaging material which is formed of a multilayer body having at least a base layer and a thermal adhesive layer, and which is a lid material, with the thermal adhesive layer being laminated as the outermost layer on one side of the packaging material, hydrophobic fine particles having a primary particle diameter of 3 to 100 nm being attached to the outside surface where the thermal adhesive layer does not adjoin another layer, and the hydrophobic oxide fine particles being configured to form a porous layer having a three-dimensional network structure, wherein the hydrophobic oxide fine particles in a region of thermal adhesion become embedded in the thermal adhesive layer during thermal adhesion process.

2. The packaging material according to claim 1, wherein the amount of the hydrophobic oxide fine particles attaching to the thermal adhesive layer is 0.01 to 10 $g/m^2$.

3. The packaging material according to claim 1, wherein the specific surface area by BET method of the hydrophobic oxide fine particles is 50 to 300 $m^2/g$.

4. The packaging material according to claim 1, which the lid material is used for sealing an opening of a container filled with contents in contact with the thermal adhesive layer of the lid material.

5. The packaging material according to claim 1, wherein particulate filler containing at least one of an organic component and an inorganic component is contained in the thermal adhesive layer.

6. The packaging material according to claim 5, wherein the average particle diameter of the particulate filler is 0.5 to 100 μm.

7. The packaging material according to claim 1, wherein the porous layer is obtained by forming a coat on the thermal adhesive layer using a dispersion of the hydrophobic oxide fine particles dispersed in a solvent, and drying the coat.

8. The packaging material according to claim 1, wherein the hydrophobic oxide fine particles are of hydrophobic silica.

9. The packaging material according to claim 8, wherein the hydrophobic silica has trimethylsilyl groups on the surface of the particle.

10. The packaging material according to claim 1, wherein an oxygen absorbent being included in at least one of the base layer and the thermal adhesive layer.

11. The packaging material according to claim 10, wherein the oxygen absorbent contains metal particles coated on at least part of the particle surfaces with at least one of a resin component and an inorganic oxide.

* * * * *